(12) United States Patent
Asai

(10) Patent No.: US 10,684,810 B2
(45) Date of Patent: Jun. 16, 2020

(54) PORTABLE TERMINAL CAUSING AN IMAGE PROCESSING DEVICE TO EXECUTE DESIGNATED OPERATIONS

(71) Applicant: BROTHER KOGYO KABUSHIKI KAISHA, Nagoya-shi, Aichi-ken (JP)

(72) Inventor: Norihiko Asai, Tajimi (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 251 days.

(21) Appl. No.: 15/352,074

(22) Filed: Nov. 15, 2016

(65) Prior Publication Data

US 2017/0153860 A1 Jun. 1, 2017

(30) Foreign Application Priority Data

Nov. 27, 2015 (JP) ................................. 2015-231585

(51) Int. Cl.
*G06F 3/14* (2006.01)
*G06F 3/0482* (2013.01)
(Continued)

(52) U.S. Cl.
CPC .............. *G06F 3/14* (2013.01); *G06F 3/0482* (2013.01); *G06F 3/0484* (2013.01); *G06F 3/0488* (2013.01); *H04N 1/00206* (2013.01); *H04N 1/00209* (2013.01); *H04N 1/00214* (2013.01); *H04N 1/00307* (2013.01); *H04N 1/00411* (2013.01); *H04N 1/00413* (2013.01); *H04N 2201/0093* (2013.01); *H04N 2201/0094* (2013.01)

(58) Field of Classification Search
CPC ........ G06F 3/14; G06F 3/0488; G06F 3/0482; G06F 3/0484; H04N 1/00411; H04N 1/00413; H04N 1/00206; H04N 1/00209; H04N 1/00214; H04N 1/00307; H04N 2201/0093; H04N 2201/0094
See application file for complete search history.

(56) References Cited

U.S. PATENT DOCUMENTS 6,732,195 B1 * 5/2004 Baldwin .................. G06F 3/121
710/18
7,010,624 B1 * 3/2006 Zhou ...................... G06F 9/4413
710/15

(Continued)

FOREIGN PATENT DOCUMENTS

JP 2012-203742 A 10/2012

*Primary Examiner* — Amy M Levy
(74) *Attorney, Agent, or Firm* — Merchant & Gould P.C.

(57) ABSTRACT

A portable terminal executes instructions to perform processes including determining whether initial acquisition information is set, and determining whether designated device information is stored. The processes further include performing, when (1) it is determined that the initial acquisition information is set to the first value and (2) it is determined that the designated device is stored: receiving the operation identification information; updating the operation identification information; specifying the operation object; receiving a user operation of designating an object; and, when the user operation is received, preparing the designated device to execute an designated operation. The designated operation identified by the operation identification information corresponds to the designated operation object.

14 Claims, 13 Drawing Sheets

(51) Int. Cl.
*G06F 3/0484* (2013.01)
*H04N 1/00* (2006.01)
*G06F 3/0488* (2013.01)

(56) References Cited

U.S. PATENT DOCUMENTS

| | | | | |
|---|---|---|---|---|
| 7,353,304 | B2* | 4/2008 | Abe | G06F 9/4413 710/72 |
| 7,669,196 | B2* | 2/2010 | Takizawa | G06F 8/65 358/1.14 |
| 8,209,678 | B2* | 6/2012 | Sadja | G06F 8/65 717/172 |
| 8,896,868 | B2* | 11/2014 | Daos | H04N 1/00095 358/1.15 |
| 9,015,329 | B2* | 4/2015 | Chang | H04L 12/2805 709/227 |
| 2003/0154323 | A1* | 8/2003 | Kujirai | G06F 8/61 719/327 |
| 2006/0044601 | A1* | 3/2006 | Misawa | G06F 3/122 358/1.15 |
| 2008/0004075 | A1* | 1/2008 | Horton | H04N 1/00132 455/557 |
| 2008/0052710 | A1* | 2/2008 | Iwai | G06F 21/305 718/100 |
| 2008/0068635 | A1* | 3/2008 | Asano | G06F 3/1204 358/1.13 |
| 2008/0183905 | A1* | 7/2008 | Kitada | G06F 9/44552 710/8 |
| 2009/0031252 | A1* | 1/2009 | Toda | G06F 9/451 715/826 |
| 2009/0150458 | A1* | 6/2009 | Igarashi | G06F 17/30569 |
| 2010/0192147 | A1* | 7/2010 | Kadota | G06F 8/61 717/178 |
| 2011/0063663 | A1* | 3/2011 | Kim | G06F 3/1206 358/1.15 |
| 2011/0126183 | A1* | 5/2011 | Bernard | G06F 8/65 717/168 |
| 2011/0307907 | A1* | 12/2011 | Hwang | G06F 3/1204 719/327 |
| 2012/0167122 | A1* | 6/2012 | Koskimies | G06F 9/5027 719/328 |
| 2012/0243029 | A1* | 9/2012 | St. Jacques, Jr. | G06F 3/1204 358/1.15 |
| 2012/0243043 | A1 | 9/2012 | Asai | |
| 2012/0289147 | A1* | 11/2012 | Raleigh | H04L 67/2847 455/3.06 |
| 2013/0198716 | A1* | 8/2013 | Huang | G06F 9/44505 717/121 |
| 2013/0235402 | A1* | 9/2013 | Yamamichi | G06F 3/1204 358/1.13 |
| 2013/0250347 | A1* | 9/2013 | Kono | H04N 1/00204 358/1.15 |
| 2014/0002851 | A1* | 1/2014 | Smith | G06F 3/1204 358/1.15 |
| 2014/0063537 | A1* | 3/2014 | Nishikawa | H04L 69/18 358/1.15 |
| 2014/0176981 | A1* | 6/2014 | Asai | G06K 15/4045 358/1.13 |
| 2014/0240775 | A1* | 8/2014 | Suzuki | G06F 3/1292 358/1.15 |
| 2014/0376045 | A1* | 12/2014 | Oyoshi | H04N 1/32128 358/1.15 |
| 2015/0092229 | A1* | 4/2015 | Miyazaki | H04N 1/00411 358/1.15 |
| 2015/0099502 | A1* | 4/2015 | Park | H04W 4/16 455/418 |
| 2015/0339544 | A1* | 11/2015 | Tashiro | G06F 3/1253 358/1.15 |
| 2016/0085484 | A1* | 3/2016 | Ichikawa | G06F 3/1205 358/1.13 |
| 2016/0103675 | A1* | 4/2016 | Aabye | G06F 8/65 717/170 |
| 2016/0105504 | A1* | 4/2016 | Vallabhaneni | H04L 67/1095 709/217 |
| 2017/0031675 | A1* | 2/2017 | Oshima | G06F 8/65 |

* cited by examiner

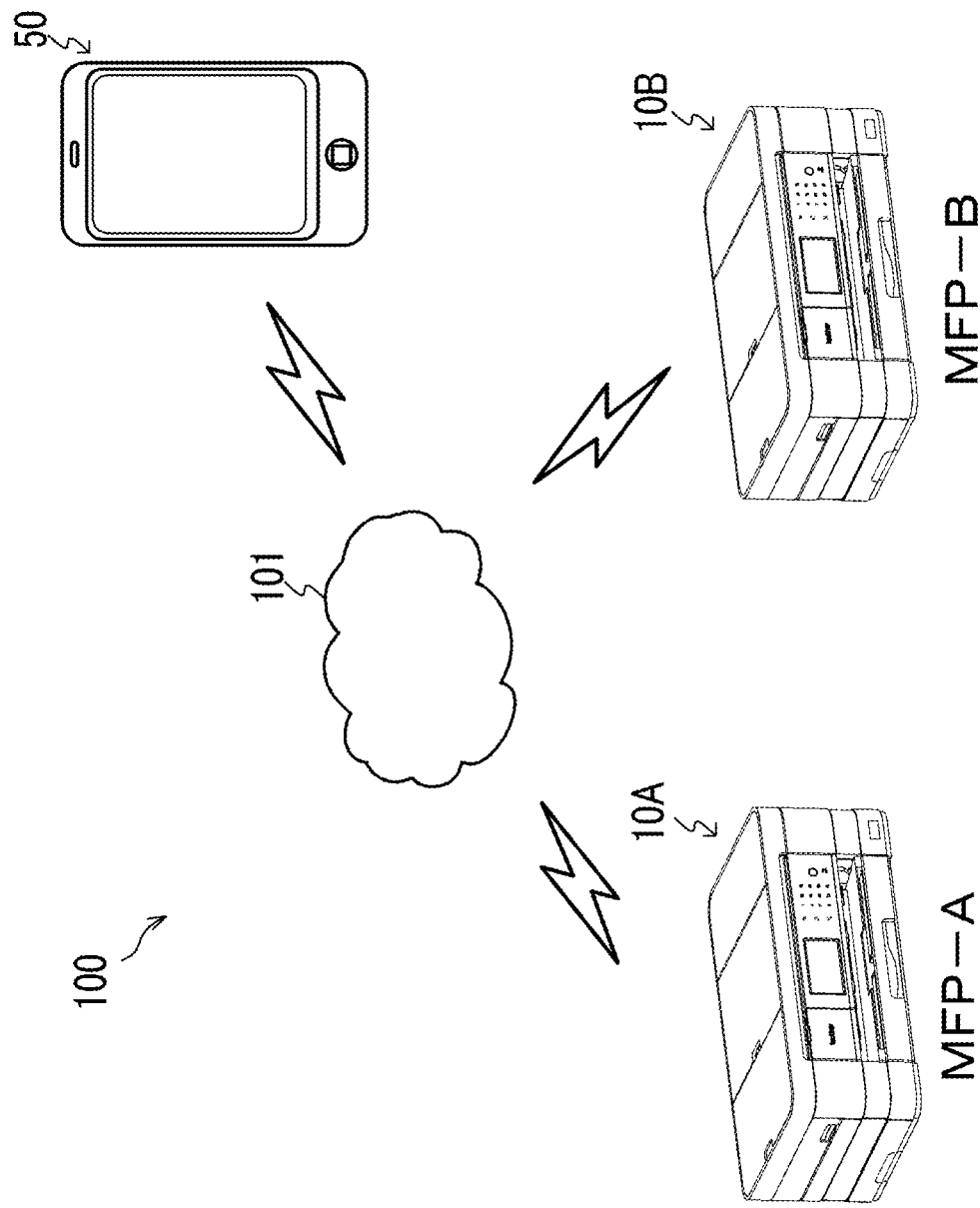

*FIG. 3A*

| FAX SPECIFICATION INFORMATION | | | FAX DATA |
|---|---|---|---|
| DATA ID | RECEPTION DATE AND TIME | TRANSMISSION SOURCE TELEPHONE NUMBER | |
| 001 | 2015.06.12 10:15 | xx-xxxx-xxxx | FAX DATA 1 |
| 002 | 2015.07.02 15:34 | yy-yyyy-yyyy | FAX DATA 2 |
| ⋮ | ⋮ | ⋮ | ⋮ |

*FIG. 3B*

| SUPPORT OPERATION ID | DEVICE ID |
|---|---|
| PRINT | MFP-A |
| SCAN | MFP-B |

*FIG. 3C*

| DEVICE ID | DEVICE OPERATION ID |
|---|---|
| MFP-A | PRINT |

*FIG. 3D*

| DEVICE ID | DEVICE OPERATION ID | OVERALL OPERATION FLAG |
|---|---|---|
| MFP-A | PRINT, FAX TRANSMISSION, FAX RECEPTION, FAX PREVIEW TRANSMISSION | ON |

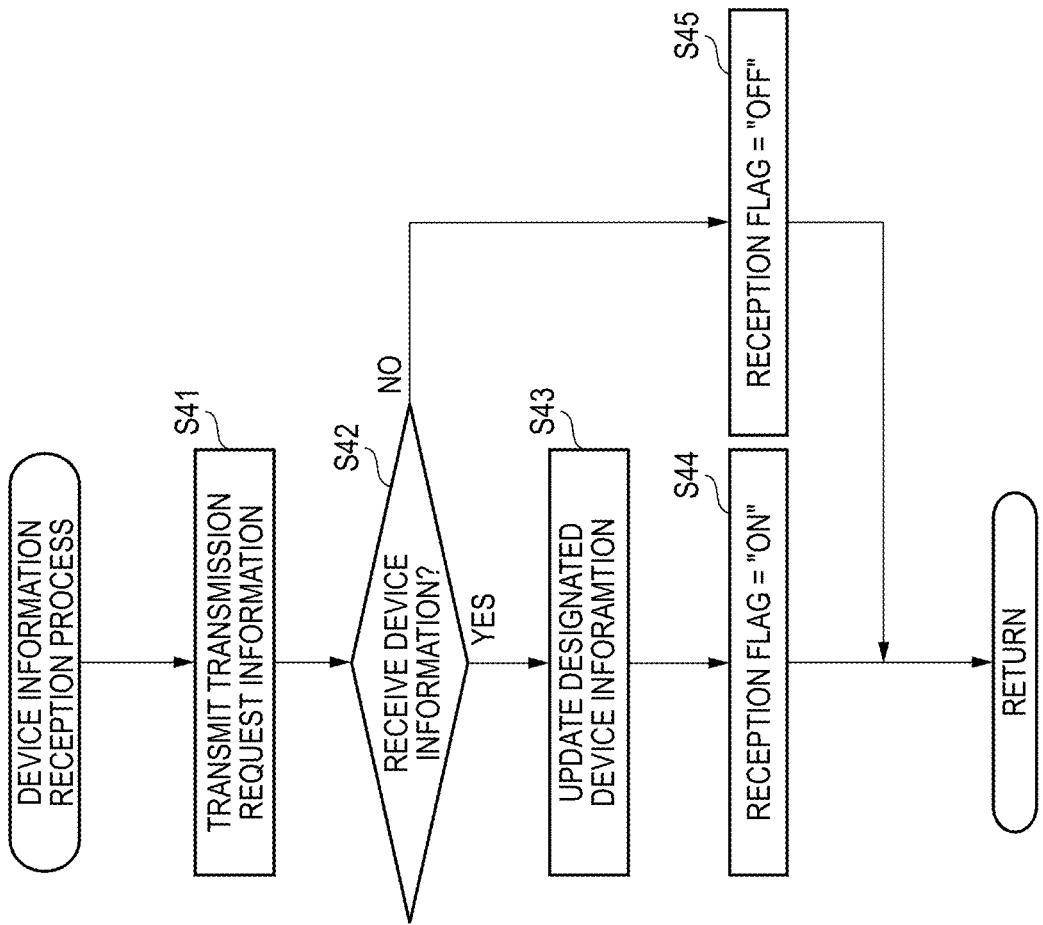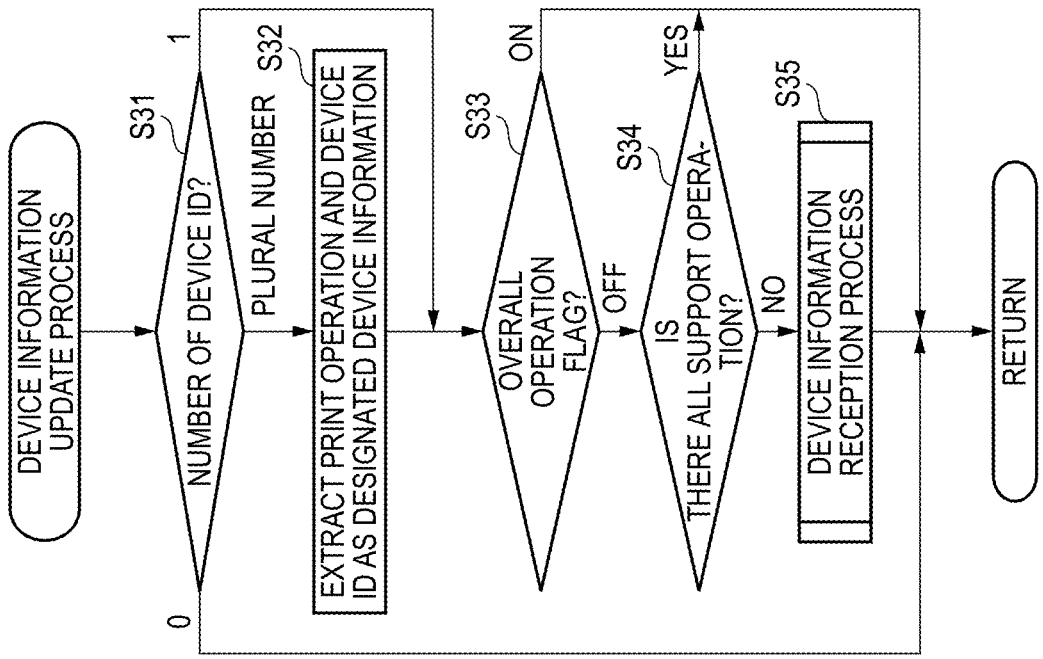

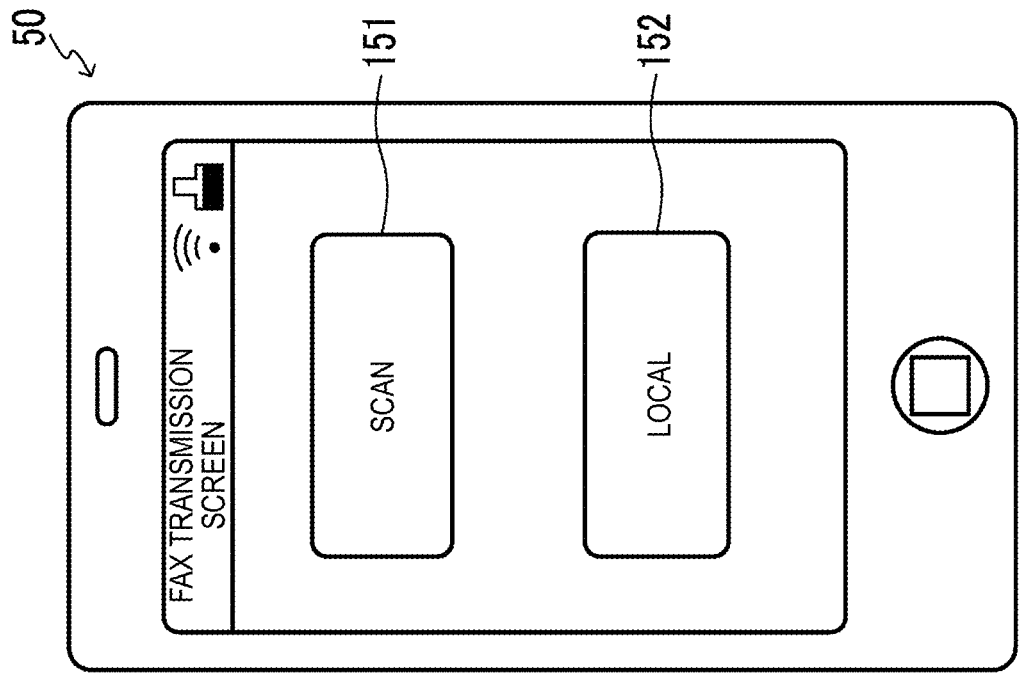
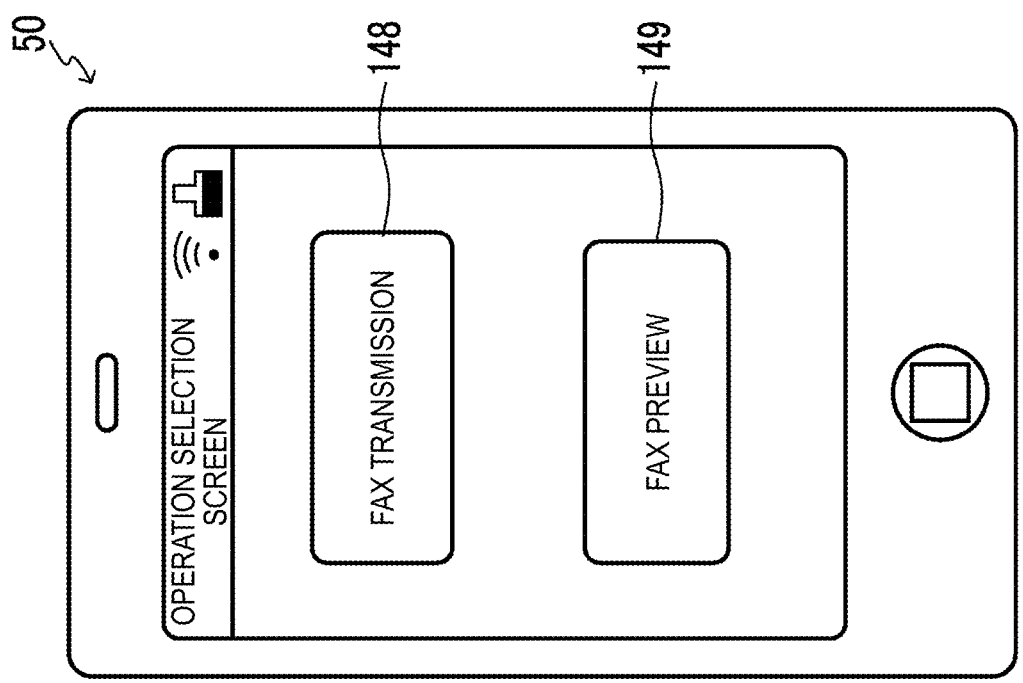

PORTABLE TERMINAL CAUSING AN IMAGE PROCESSING DEVICE TO EXECUTE DESIGNATED OPERATIONS

CROSS-REFERENCE TO RELATED APPLICATION

This application claims priority from Japanese Patent Application No. 2015-231585 filed on Nov. 27, 2015, the entire subject matter of which is incorporated herein by reference.

TECHNICAL FIELD

This disclosure relates to instructions of a program readable by a portable terminal. The instructions of the program cause the portable terminal to execute a processing for causing an image processing device to execute operations for image data.

BACKGROUND

An application, which allows a user to designate content data and causes an image processing device to execute an operation for the designated content data, is known. For example, a background application allows a user to designate image data stored in a portable terminal and causes a printer to print an image represented by the image data.

SUMMARY

An application of a portable terminal is, for example, designed by assuming individual user to easily print image data and therefore is required for a simple configuration that focuses on implemented functions. The portable terminal which executes the application has a small screen size as compared to a PC or the like and therefore is required for a user interface which simply intuitive operation is available.

In recent years, so-called "a multifunction peripheral (hereinafter referred to as MFP)", in which a printer is equipped with a scanner, a FAX, and the like, has become popular. Then, in order for a user to effectively utilize a function of an MFP, it is required to use an application of a portable terminal as a guide line to guide the user to the functions implemented in the MFP. As an example, it is desirable that an application of a portable terminal collects device information indicating capability of an MFP, and provides a user interface which becomes a guide line to each function with using the collected device information.

Here, the application of the portable terminal may be made version-upgrade by a variety of reasons for improving the guide line. However, the application of previous version does not have to collect all of the device information that the application of new version needs. Therefore, if the application of new version takes over directly the device information that the application of previous version collects, it may be impossible to provide a suitable user interface.

This disclosure is to provide a program capable of providing a suitable user interface based on the information which is taken over from the program of previous version.

A non-transitory computer-readable medium of this disclosure stores instructions to control a portable terminal, which has a network interface, a display, a user interface, and a storage, the instructions causing the portable terminal to perform processes including: a first determination processing of determining whether initial acquisition information stored in the storage is set to either of a first value and a second value, wherein the first value is a value to which the initial acquisition information is set at a time when the corresponding instructions is installed to version-upgrade and is initially activated in the portable terminal in which previous version instructions is installed, and the second value is a value to which the initial acquisition information is set after the corresponding instructions is installed to version-upgrade and the first determination processing is initially executed, a second determination processing of determining whether designated device information is stored in the storage, wherein the designated device information is information stored in the storage by the previous version instructions, and the designated device information includes device identification information of identifying a designated device which is one of a plurality of image processing devices having an execution unit capable of executing an operation for image data, and operation identification information of identifying an operation which is executable by the designated device, performing, when it is determined in the first determination processing that the initial acquisition information is set to the first value and it is determined in the second determination processing that the designated device is stored, operations comprising: a first reception processing of receiving the operation identification information from the designated device through the network interface; a first update processing of updating the operation identification information included in the designated device information to the operation identification information received by the first reception processing; a specifying processing of specifying the operation object which is corresponding to the operation identification information included in the designated device information among the operation objects which is to be displayed on the display by the instructions; a first display processing of displaying a first screen including the operation object specified by the specifying processing on the display; a receiving processing of receiving a user operation of designating an object through the user interface; and performing, when the user operation of designating the operation object is received by the receiving processing, an execution preparing processing of preparing the designated device to execute an designated operation, wherein the designated operation is an operation identified by the operation identification information corresponding to the designated operation object.

According to the above configuration, at a time when the program is installed to version-upgrade and is initially activated, the program can provide a user interface which becomes an appropriate guide line to each function that the program of new version supports, based on the operation identification information received from the designated device represented by device identification information which is taken over from the program of previous version.

BRIEF DESCRIPTION OF THE DRAWINGS

The foregoing and additional features and characteristics of this disclosure will become more apparent from the following detailed descriptions considered with the reference to the accompanying drawings, wherein:

FIG. 1 is a schematic block diagram of a system 100 according to the embodiment;

FIGS. 3A to 3D are a diagram showing an example of information stored in a data storage area 32B, 62B, FIG. 3A is showing a FAX list, FIG. 3B is showing designated device information of a terminal program 65 of version 1.0, FIG.

3C is showing designated device information of a terminal program 65 of version 1.1, and FIG. 3D is showing designated device information of the terminal program 65 of version 1.2;

FIG. 5A is a flow chart of the device information update processing, and FIG. 5B is a flow chart of a device information reception processing;

FIG. 8A is showing a menu screen, and FIG. 8B is showing a permit confirmation screen;

FIG. 9A is showing a main screen in a case where an MFP 10A is designated as a designated device, and FIG. 9B is showing a main screen in a case where a designated device is not designated;

FIG. 10A is showing a device selection screen, and FIG. 10B is showing a main screen in a case where an MFP 10B is designated as a designated device;

FIG. 11A is showing a data selection screen, and FIG. 11B is showing the preview screen;

FIGS. 12A and 12B are a diagram showing a display example of the display 53, FIG. 12A is showing an operation selection screen, and FIG. 12B is showing a FAX transmission screen; FIG. 13A is showing a FAX selection screen, and FIG. 13B is showing a FAX preview screen.

DETAILED DESCRIPTION

Hereinafter, embodiments of this disclosure will be described with reference to the accompanying drawings. The embodiments described below are merely examples of the present invention. The embodiments of this disclosure can be appropriately changed within a range not changing scope of the present invention. For example, the execution order of each processing to be described later can be suitably changed within a scope without changing scope of the present invention.

FIG. 1 is a schematic diagram of a system 100 according to this embodiment. A system 100 illustrated in FIG. 1 includes MFPs 10A and 10B (hereinafter, these are collectively sometimes referred to as "an MFP 10") and a portable terminal 50. An MFP 10 and a portable terminal 50 are configured to be capable of communicating through a communication network 101. The communication network 101 may be, for example, a cable LAN 31, a wireless LAN, or a combination thereof.

Figure 2A:
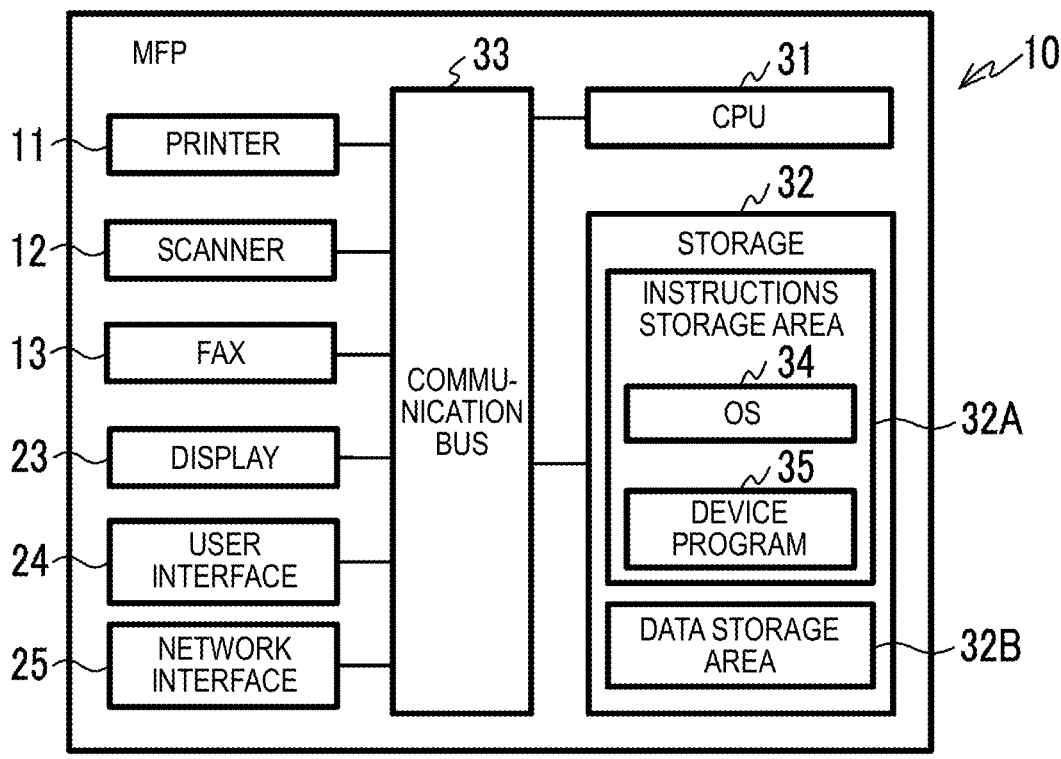
FIG. 2A is a block diagram of the MFP 10.

The MFP 10 mainly includes, as illustrated in FIG. 2A, a printer 11, a scanner 12, a FAX 13, a display 23, a user interface 24, a network interface 25, a CPU 31, a storage 32 and a communication bus 33. Components forming the MFP 10 are connected to each other through a communication bus 33. The MFP 10 is an example of an image processing device.

The printer 11 executes a printing operation for recording an image represented by image data on a recording sheet. The recording sheet is an example of a sheet or recording medium. As a recording method of the printer 11, a well-known method such as an inkjet method or an electro photo graphic method can be employed. The scanner 12 executes a scanning operation for generating image data by reading an image recorded on a document. The FAX 13 executes a FAX transmission operation and a FAX reception operation for transmitting and receiving image data in a manner conforming to a FAX protocol. The printer 11, the scanner 12, and the FAX 13 are an example of the execution unit.

The printing operation and the FAX transmission operation among the plurality of operations described above is an example of an output operation that outputs the image data. An output operation which the MFP 10 executes is not limited thereto. As other examples of the output operation, the MFP 10 may execute the FAX preview transmission operation of transmitting the subject image data to the portable terminal 50 through the network interface 25 in order to display an image indicated by an image data received by the FAX reception operation. The scan operation and the FAX reception operation among the plurality of operations described above are an example of an image forming operation of forming an image data. In addition, the FAX transmission operation and the FAX reception operation are executed by the FAX 13.

Further, the MFP 10 may be capable of executing complex operations by combining a plurality of operations. For example, a copy operation of recording an image data generated by the scanning operation on a recording sheet with using the printing operation, a scan FAX operation for transmitting the image data generated by the scanning operation with using the FAX transmission operation, and a FAX printing operation for recording the image data received by a FAX receiving processing on a recording sheet with using the printing operation are an example of a combined operation.

Operations that the MFPs 10A, 10B can execute may be different. The MFP 10A according to this embodiment may execute a printing operation, a FAX transmission operation, a FAX reception operation, a FAX preview transmission operation, and a copy operation. On the other hand, the MFP 10B according to this embodiment may execute a printing operation, a scanning operation, and a copy operation. Further, the image processing device is not limited to being capable of executing a plurality of operations, but may be capable of executing only a single operation.

In an MIB of the MFP 10, for example, a device ID for identifying the MFP 10, and a device operation ID for identifying an operation which the MFP 10 can execute may be defined. The device ID is an example of device identification information, and the device operation ID is an example of the operation identification information. In the present embodiment, the MFP 10A is identified by device ID "MFP-A", and the MFP 10B is identified by device ID "MFP-B". Hereinafter, the device ID and the device operation ID registered in the MIB may be referred to as "device information".

A display 23 includes a display screen for displaying various types of information. As the display 23, a liquid crystal display and an organic EL display may be employed.

A user interface 24 is manipulated by a user to designate an object displayed on the display screen of the display 23. More specifically, the user interface 24 has buttons, and outputs various types of operation signals that are associated to the pressed buttons to the CPU 31. Further, the user interface 24 may have a film-like touch sensor superimposed on the display screen of the display 23. That is, the display 23 may be configured as a touch panel display.

An "object" refers to an image that can be designated by operating the user interface 24 by a user. As an example, the object may be a character string, an icon, a button, a link or the like displayed on the display 23. The object may be designated by pressing a direction key or an enter button of the user interface 24. If the user interface 24 is a touch panel, the object displayed on the display 23 may be designated by touching a display position.

The user interface 24, which is realized as a touch panel, outputs position information indicating a position on the display screen that the user touches. Incidentally, the "touch" in the present specification includes general operation of contacting the input medium on the display screen. That is, tap operation to separate the touched input medium from the display screen within a predetermined time, long touch operation, slide operation to slide the touched input medium on the display screen, flick operation, pinch operation, pinch out operation or the like are an example of touch.

Further, even if an input medium is not touching a display screen, a case that distance between the input medium and the display screen is brought close to the input medium to negligible position may be included in the concept of "touch" described above. The input medium may be a user's finger, a touch pen or the like. Hereinafter, tap of the position of the icon displayed on the display 53 will be described as an example of a user operation of designating the icon.

A network interface 25 is an interface for communicating with an external device through the communication network 101. That is, the MFP 10 outputs various types of information to the portable terminal 50 through the network interface 25, receives various types of data or various types of information from the portable terminal 50 through the network interface 25. Specific communication procedure of the network interface 25 is not particularly limited, but, for example, Wi-Fi (registered trademark of Wi-Fi Alliance) may be employed.

A CPU 31 is to control the overall operations of the MFP 10. The CPU 31 acquires and executes the later-described various programs from a storage 32 based on various types of information output from the user interface 24, various types of information acquired from the external device through the network interface 25 and the like. That is, the CPU 31 and the storage 32 form an example of the control unit.

A storage 32 includes a program storage area 32A and a data storage area 32B. In the program storage area 32A, an OS 34 and a device program 35 is stored. The device program 35 may be a single program, or may be a collection of multiple programs. In the data storage area 32B, data or information needed to execute the device program 35 is stored.

The "data" and "information" in the present specification are common in that "data" and "information" are computer readable bit or bit sequence. The "data" refers to data that can be handled by the computer without considering a meaning that each bit represents. In contrast, the "information" refers to information that operations of the computer are branched according to a meaning that each bit represents. Further, the "instruction", which is a control signal for prompting a next operation to a destination device to be transmitted, may contain information or may have a property as information in itself.

Moreover, format of "data" and "information" may be changed for each computer (for example, text format, binary format, or flag format), but as long as "data" and "information" having changed format are recognized as the same meaning, respectively, the "data" and "information" are treated as the same data and information. For example, information of indicating "two" may be retained in some computers as information in a text format "0x32" with using the ASCII code, or may be retained in the other computers as information in binary form "10" with using binary notation.

However, distinction between "data" and "information" described above is not critical and also exceptional handling between "data" and "information" is acceptable. For example, data may be temporarily treated as information, and information may be temporarily treated as data. Furthermore, the data, which is treated as data in some devices, may be treated as information in other devices. Furthermore, information may be extracted from data, and data may be extracted from information.

The storage 32 is formed by, for example, a RAM, a ROM, an EEPROM, a HDD, and a buffer included in a CPU 31 or a combination thereof.

The storage 32 may be a computer readable storage medium. The computer readable storage medium is a Non-transitory medium. The Non-transitory medium includes a recording medium such as a CD-ROM and a DVD-ROM in addition to the above example. Further, the Non-transitory medium is also a tangible medium. On the other hand, an electrical signal for conveying a program downloaded from a server on the Internet is a the computer readable signal medium which is a type of computer readable medium, but is not included in a Non-transitory storage medium that computer can read out.

A program stored in a program storage area 32A is executed by CPU 31. However, in this specification, the operation of each program will be described with omitting the CPU 31. That is, in the following description, an expression that "a program A executes a processing A" may refer to an expression that the "CPU 31 executes a processing A described in a program A". The same applies to the portable terminal 50 to be described later.

A program stored in the program storage area 32A determines events and operates according to the determination result. However, in this specification, the operation of each program will be described with omitting the determination. That is, in the following description, an expression that "a program executes a processing A according to a condition A" may refer to an expression that "a program determines whether a condition A. The program executes a processing A in response to a positive determination". The same applies to the portable terminal 50 to be described later.

A program stored in the program storage area 32A identifies, acquires, extracts, determines, or selects the data or the like. An expression that a program specifies data refers to, for example, a processing that a program specifies data which is matching a condition from among a plurality of data, and stores data in itself or information for identifying the data in a storage area which is predetermined. The information for identifying the data is, for example, identification information for identifying data, an index of an array in which the data is stored, a pointer of a storage area in which the data is stored, or the like. A processing that a program acquires, extracts, determines, or select data is also the same. The same applies to the portable terminal 50 to be described later.

An OS 34 includes basic programs that provide APIs for controlling a printer 11, a scanner 12, a FAX 13, a display 23, the user interface 24, and a network interface 25 which forms the MFP 10. In other words, each of the above programs controls each of hardware by calling the API that OS 34 provides. However, in this specification, an operation of each program will be described with omitting the OS 34. That is, in the following description, an expression that "a program B controls a hardware C" may refer to an expression that "a program B controls a hardware C through an API of the OS 34". The same applies to the portable terminal 50 to be described later.

As illustrated in FIG. 3A, FAX specification information and FAX data corresponding to the FAX specification information can be stored in the data storage area 32B. Hereinafter, the whole information illustrated in FIG. 3A sometimes referred to as "FAX list", and a set of the FAX specification information and the FAX data which are associated with each other in a FAX list may be referred to as "FAX record". That is, the FAX list may include a plurality of FAX records. FIG. 3A shows an example of a FAX list of the MFP 10A.

The FAX data is image data which an MFP 10A receives from the external device through a FAX 13. The FAX specification information is information for specifying individually FAX data to an MFP 10A. The FAX specification information includes, for example, a data ID which is data identification information for identifying the FAX data to an MFP 10A, the reception date of the FAX data identified by the data ID, and transmission-source telephone number which specifies transmission source of FAX data identified by the data ID.

A device program 35 of the MFP 10A adds a FAX record to a FAX list in response to executing the FAX reception operation. More specifically, the device program 35 receives the FAX data and the transmission-source telephone number from an external device through a FAX 13 by FAX reception operation. The device program 35 generates a unique data ID in the FAX list and obtains the reception date and time from a system clock (not illustrated) in response to executing the FAX reception operation. And, the device program 35 adds a FAX record that contains these to the FAX list. The FAX reception operation is automatically executed by the MFP 10A regardless of the instructions from the portable terminal 50.

The device program 35 may read, edit, or delete the data stored in the data storage area 32B by executing an access API provided by the OS 34. In the access API, a data ID for identifying the data to be accessed is designated as a fact. The data ID is information in the form of being used to designate data to the access API. The data ID is, for example, a file path or URI. On the other hand, part or all of the data stored in the data storage area 32B may be stored in an external server (not illustrated) such as a cloud server. That is, a device program 35 may transmit various types of data to the external server through the network interface 25, and receive various types of data from the external server through the network interface 25. In this case, the data ID may be, for example, in the form of URL for downloading data from an external server. The same applies to the portable terminal 50.

Figure 2B:
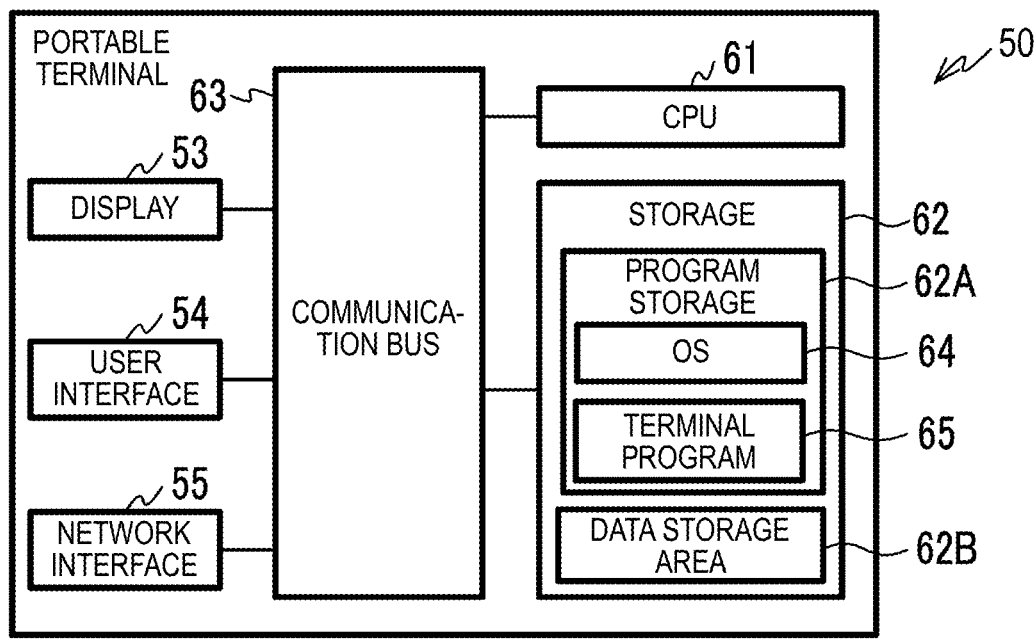
FIG. 2B is a block diagram of a portable terminal 50.

The portable terminal 50 mainly includes a display 53, a user interface 54, a network interface 55, a CPU 61, a storage 62, and a communication bus 63 as illustrated in FIG. 2B. The display 53, the user interface 54, the network interface 55, the CPU 61, the storage 62, and the communication bus 63 included in the portable terminal 50 are the same structure as the display 23, the user interface 24, the network interface 25, the CPU 31, the storage 32, and the communication bus 33 included in the MFP 10, and thus descriptions thereof are omitted. The CPU 61 and the memory unit 62 are an example of a control unit.

The portable terminal 50 is, for example, a mobile phone, a smart phone, tablet terminal, or the like. More specifically, the display 53 of the portable terminal 50 has preferably a display screen size of 12 inches or less, more preferably 8 inches or less. The user interface 54 of the portable terminal 50 is preferably the touch panel superimposed on the display screen of the display 53.

A program storage area 62A of a storage 62 stores an OS 64 and a terminal program 65. The OS 64 may be, for example, Android (registered trademark of Google inc.) OS, iOS (registered trademark of Cisco Systems, Inc.), Windows Phone (registered trademark of Microsoft Corporation), an Operating System, or the like.

The terminal program 65 is a program for executing a designated operation regarding the designated data to a designated device. The designated data refers to image data designated by the user. The designated operation refers to operation designated by the user. The designated device refers to the MFP 10 designated by the user. The terminal program 65 can receive designated data, designated operation, and user operation to designate the designated device through the user interface 54. Hereinafter, the data identification information for identifying the designated data is referred to as "designated data ID", the operation identification information identifying the designated operation is referred to as "designated operation ID", and the device identification information for identifying the designated device is referred to as "designated device ID".

Further, in the portable terminal 50, one of a plurality of terminal programs 65 which are different in version is installed. The pluralities of terminal programs 65 which are different inversion are common in the basic function of executing the designated operation regarding the designated data to the designated device. On the other hand, a plurality of terminal programs 65 which are different in version are different in a support operation, a user interface, or a way of storing various types of information. In the present embodiment, three terminal programs 65 of version 1.0, version 1.1, and version 1.2 are assumed to be released. The common program ID is assigned to each version of the terminal programs 65. Further, a common file name may be assigned to an execution file of each version of the terminal programs 65.

A support operation refers to an operation which a terminal program 65 can execute an execution preparing processing described later. In other words, the support operation refers to an operation that may be designated operation. In this embodiment, the support operation of the terminal program 65 of version 1.0 and 1.1 is a printing operation and a scan operation. On the other hand, the support operation of the terminal program 65 of version 1.2 is a printing operation, scan operation, a copy operation, a FAX transmission operation, and a FAX preview transmission operation.

An OS 34 can install a terminal program 65. Specifically, in response to the reception of an instruction operation for installing a terminal program 65 through a user interface 54, the OS 34 receives an execution file of the terminal program 65 from a server (not illustrated) through the network interface 55. The OS 34 installs the received terminal program 65 in the portable terminal 50. Incidentally, a processing of installing the terminal program 65 may be executed by an installer program on behalf of the OS 34.

It should be noted that, when the terminal program 65 of previous version to which the same program ID as a terminal program 65 received from a server has been assigned is installed in the portable terminal 50, the OS 64 executes an version-upgrade installation of overwriting an execution file of a terminal program 65 of new version which is received on an execution file of a terminal program 65 of previous version which has already been stored in a program storage area 62A. Further, when the terminal program 65 of older version to which the same file name as the terminal program 65 received from the server is assigned is installed in the portable terminal 50, the OS 64 may execute the version-upgrade installation. In this embodiment, as an example, the version 1.0 and 1.1 are previous version and the version 1.2 is new version.

The data storage area 62B can store designated device information illustrated in any of FIGS. 3B to 3D. The designated device information illustrated in FIGS. 3B to 3D is common in including a device ID for identifying the designated device and an operation ID for identifying an operation which the designated device can execute. The operation ID that is included in the designated device information is a support operation ID or a device operation ID. On the other hand, the designated device information illustrated in FIGS. 3B to 3D is different in the number of a device ID and whether including the overall operation flag.

FIG. 3B is a diagram of showing an example of designated device information stored in the data storage area 62B by a terminal program 65 of version 1.0. FIG. 3C is a diagram of showing an example of designated device information stored in the data storage area 62B by a terminal program 65 of version 1.1. FIG. 3D is a diagram of showing an example of designated device information stored in the data storage area 62B by a terminal program 65 of version 1.2. However, the format of the designated device information in which the terminal program 65 of each version is stored in the data storage area 62B is not limited to the above example.

In the designated device information illustrated in FIG. 3B, a support operation ID and a device ID are associated with one-to-one. A support operation ID ("Print", "Scan") illustrated in FIG. 3B is an operation ID of the support operation of the terminal program 65 of version 1.0. That is, in the terminal program 65 of version 1.0, a different designated device can be designated to each support operation. In other words, the designated device information illustrated in FIG. 3B may include a plurality of designated device ID. The device ID which is associated with each support operation ID may be the same or different.

On the other hand, in the designated device information illustrated in FIGS. 3C and 3D, one or more device operation ID is associated with the device ID. That is, in the terminal program 65 of version 1.1 and 1.2, it is possible to designate only one designated device to one or more device operation ID(s). In other words, the designated device information illustrated in FIGS. 3C and 3D can include only one designated device ID.

Further, the designated device information illustrated in FIG. 3D includes an overall operation flag. The overall operation flag is an example of the overall operation acquiring information of indicating whether the designated device information includes the device operation ID corresponding to all operations that the designated device can execute. More particularly, the operation flag is set to a third value "ON" in a case where the designated device information includes the device operation ID corresponding to all operations which the designated device can execute, and is set to a fourth value "OFF" in a case where the designated device information does not include the device operation ID corresponding to all operations that the designated device can execute.

Specifically, the terminal program 65 of version 1.0 and 1.1 stores, for example, designated device information illustrated in FIG. 3B or FIG. 3C in the data storage area 62B by a processing which is similar to a device selection processing described later. However, the terminal program 65 of version 1.0 and 1.1 transmits transmission request information including one of the support operation IDs to the designated device through the network interface 55. Then, the terminal program 65 of version 1.0 and 1.1 receives information of indicating whether a support operation ID, which is included in the transmission request information, is included in the device information as a response to the transmission request information from the designated device through the network interface 55.

For example, the terminal program 65 of version 1.0 transmits the transmission request information for requesting the return of the device operation ID "Print" to the MFP 10A, and receives information including the device operation ID "Print" from the MFP 10A, when the MFP 10A is selected as the designated device corresponding to a printing operation which is one of the support operation. The terminal program 65 of the version 1.0 transmits the transmission request information for requesting the return of the device operation ID "Scan" to the MFP 10B, and receives information including the device operation ID "Scan" from the MFP 10B, when the MFP 10B is selected as the designated device corresponding to the scanning operation which is one of the supported operation. In addition, the MFP 10 returns the device operation ID when requesting the return of the device operation ID corresponding to the executable operation, and do not return the device operation ID when requesting the return of the device operation ID corresponding to the non-executable operation.

The terminal program 65 of version 1.1 transmits, for example, transmission request information for requesting the return of device operation IDs ("Print" and "Scan") corresponding to the printing operation which is supported operation and the scan operation to the MFP 10A and receives information including the device operation IDs ("Print" and "scan") from the MFP 10A, when the MFP 10A is selected as the designated device. The terminal program 65 of version 1.1 may transmit a piece of transmission request information for requesting the return of the plurality of device operation IDs, and may transmit a plurality of transmission request information for requesting the return of one device operation ID, respectively.

In addition, there is a deterrent in that the support operation ID is to identify an operation which a terminal program 65 supports, and the device operation ID is to identify an operation which an MFP 10 can execute. However, the support operation ID and the device operation ID that identify the same operation are the same value. That is, the terminal program 65 do not have to distinguish between the support operation ID and the device operation ID, when referring to designated device information illustrated in FIGS. 3B to 3D. However, in FIGS. 3B to 3D, in order to clarify that the designated device information is stored as a base point of an operation which the terminal program 65 supports or the designated device information is stored as a base point of an operation which the MFP 10 can execute, the support operation ID and the device operation ID are individually described for the sake of convenience.

The data storage area 62B stores an initial flag which is an example of the initial acquisition information and a reception completed flag which is an example of the reception completed information. The initial flag is set to a first value "ON" at a time when the terminal program 65 of version 1.2 is installed and then started initially, and is set to a second value "OFF" after a first determination processing (S11) described below is executed initially. The reception completed flag is set to a fifth value "OFF" representing that the device information is not received from the designated device in the first reception processing (S42) described later, or is set to a sixth value "ON" representing that the device information is received from the designated device in a first reception processing.

The designated device information stored in the data storage area 62B by the terminal program 65 of version 1.0 and 1.1 is not overwritten even when version-upgrade installation is performed in the terminal program 65. That is, immediately after the version-upgrade installation, a terminal program 65 of new version may refer to the designated device information that the terminal program 65 of previous version has been stored in the data storage area 62B. In addition, the initial flag and the reception completed flag are in a form where the initial value is set when the terminal program 65 of new version is started initially after the version up installation of the terminal program 65. The initial value of the initial flag is a first value "ON", and the initial value of the reception completed flag is the fifth value "OFF".

The values, to which the various flags stored in the data storage area 62B are set, are not limited to "ON" and "OFF". For example, the various flags may be stored in the data storage area 62B to represent one of the two states and be deleted from the data storage area 62B to represent the other. In this case, the terminal program 65 may determine whether the corresponding program is stored in the data storage area 62B in a processing of determining the value of the flag.

Further, the data storage area 62B may be provided with a data folder. In the data folder, for example, photographic data, document data, presentation data, spreadsheet data or the like may be stored.

[Operation of System 100]

Referring to FIGS. 4 to 7, an operation of a system 100 according to the present embodiment will be described. It is assumed that a terminal program 65 of version 1.2 is installed in the portable terminal 50 according to this embodiment.

Figure 8A:
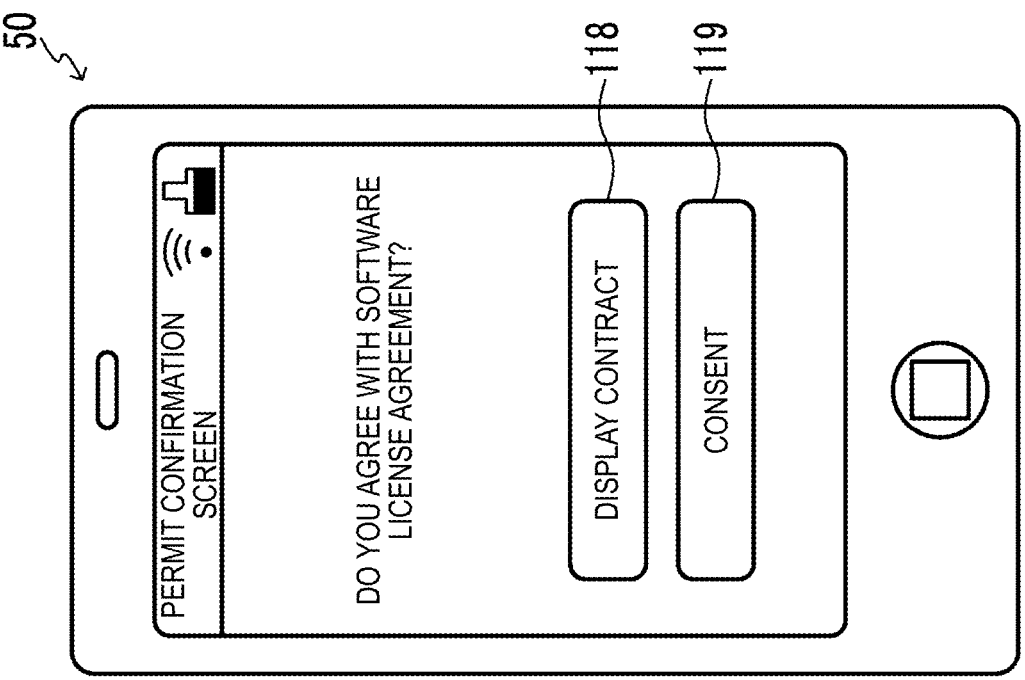
FIGS. 8A and 8B are a diagram showing a display example of the display 53.

First, an OS 64 of a portable terminal 50 displays a menu screen on a display 53. FIG. 8A is a diagram showing an example of a menu screen. The menu screen illustrated in FIG. 8A includes a plurality of program icons 111, 112, 113, 114, 115. The program icons 111 to 115 are corresponding to a program installed in the portable terminal 50. For example, the program icon 111 is corresponding to the terminal program 65.

Figure 4:
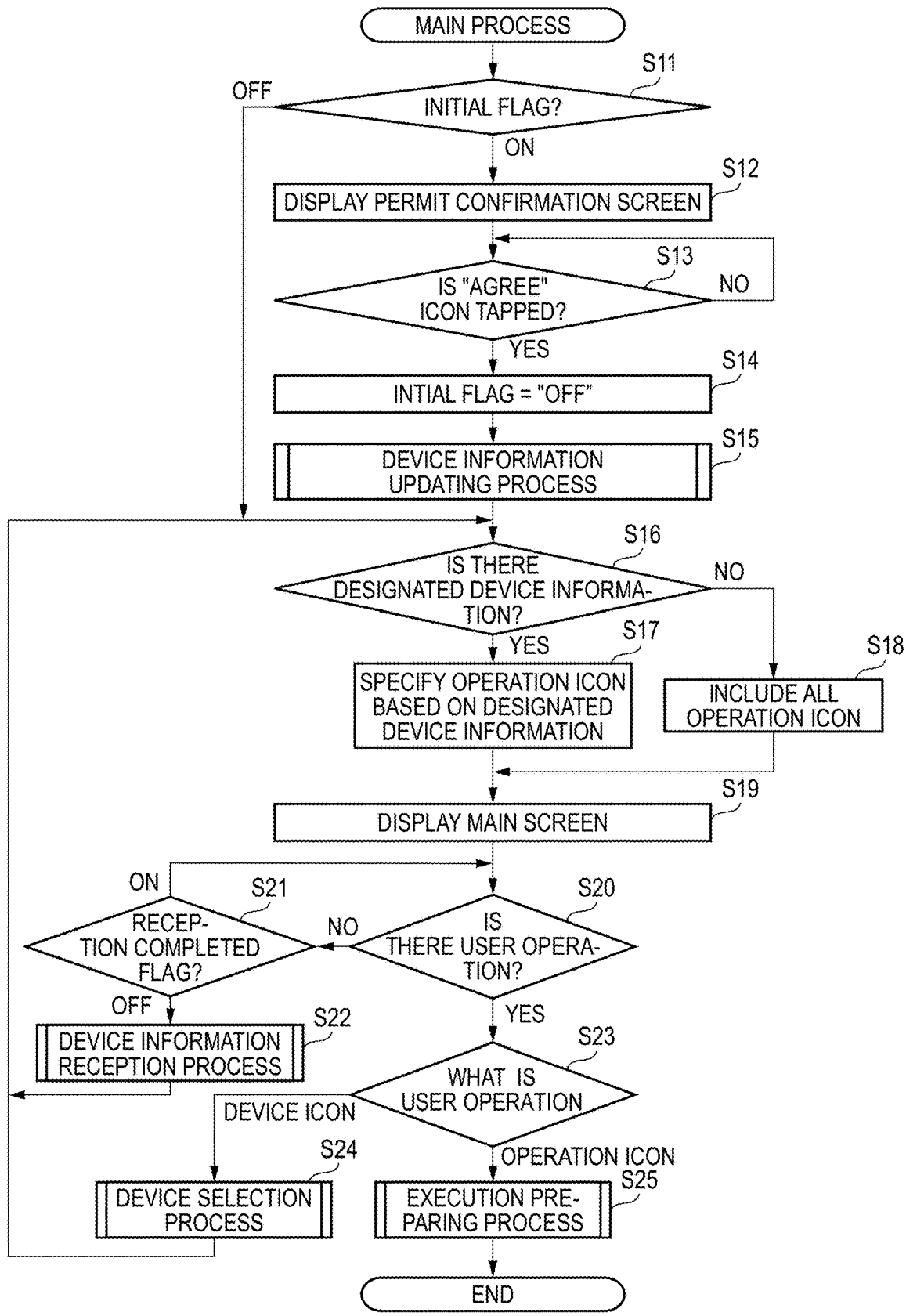
FIG. 4 is a flowchart of a main processing.

The OS 64 receives designation of one of the program icons 111 to 115 through a user interface 54. The OS 64 activates the terminal program 65 when receiving the designation of the program icon 111 through the user interface 54. The designation of the program icon 111 is an example of user operation for instructing activation of the terminal program 65. The terminal program 65 of the portable terminal 50 executes the main processing when being activated by the OS 64. Referring to FIG. 4, the main processing will be described.

[Main Process]

First, the terminal program 65 determines whether the initial flag is set to any one of "ON" and "OFF" (S11). Then, when it is determined that the initial flag is set to "OFF" (S11: OFF), the terminal program 65 skips processings of steps S12 to S15, and executes a step S16 and subsequent steps. That is, the processings of steps S12 to S15 are executed in timing of activating initially the terminal program 65 that version-upgrade installation is performed.

On the other hand, when it is determined that the initial flag is set to "ON" (S11: ON), the terminal program 65 displays a permit confirmation screen on the display 53 (S12). Then, the terminal program 65 receives user operation onto the permit confirmation screen through the user interface 54 (S13). The processing of step S11 is an example of a first determination processing, the processing of step S12 is an example of a second display processing, and the processing of step S13 is an example of a reception processing. Moreover, the permit confirmation screen is an example of a second screen.

Figure 8B:
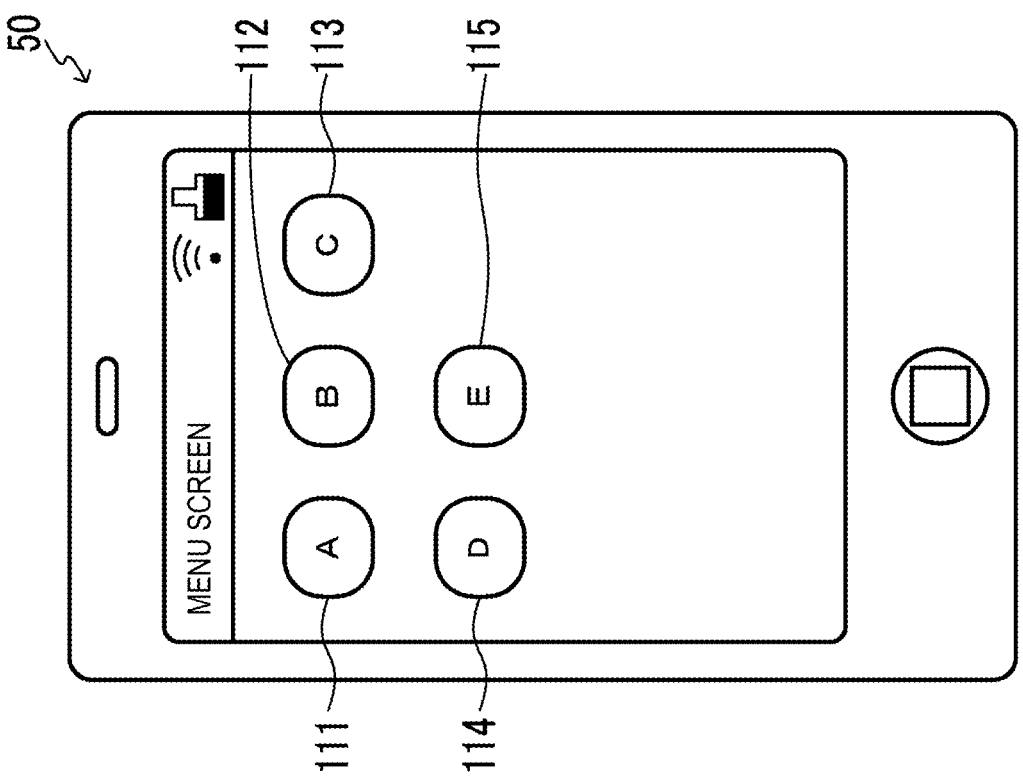

The permit confirmation screen is a screen for confirming whether to agree with the use conditions of the terminal program 65 which is described in the software license agreement to the user of the portable terminal 50. FIG. 8B is a diagram showing an example of a permit confirmation screen. The permit confirmation screen illustrated in FIG. 8B includes a message "Do you agree with the software license agreement?", a "Contract" icon 118, and a "Consent" icon 119. The "Contract" icon 118 is corresponding to an instruction to display a main sentence of the software license agreement on the display 53. The "Consent" icon 119 is an example of a consent object which is corresponding to consent to the use conditions.

Then, when receiving user operation of designating the "Contract" icon 118 through the user interface 54, although not illustrated, the terminal program 65 displays the main sentence of the software license agreement on the display 53. Further, when receiving user operation of designating the "Consent" icon 119 through the user interface 54 (S13: Yes), the terminal program 65 sets the initial flag to "OFF" (S14).

The terminal program 65 executes a device information updating processing (S15). In the device information updating processing, the terminal program 65 of previous version updates the designated device information stored in the data storage area 62B. Referring to FIG. 5A, the details of the device information updating processing will be described. The device information updating processing is desirably executed in parallel with the second display processing (S12).

[Device Information Updating Process]

First, the terminal program 65 determines whether the designated device information is stored in the data storage area 62B (S31). If version-upgrade of the terminal program 65 is made from version 1.0 to version 1.2, the designated device information illustrated in FIG. 3B is stored. On the other hand, if version-upgrade of the terminal program 65 is made from version 1.1 to version 1.2, the designated device information illustrated in FIG. 3C is stored. On the other hand, if the terminal program 65 is newly installed in the portable terminal 50, and if the terminal program 65 of previous version is not allowed to store the designated device information in the data storage area 62B, the designated device information is not stored. The processing in step S31 is an example of a second determination processing.

Then, when it is determined that the designated device information is not stored in the data storage area 62B (S31: 0), the terminal program 65 skips the processings of steps S32 to S35 and end the device information updating processing. Further, when it is determined that the designated device information including a plurality of device IDs, i.e.

the designated device information illustrated in FIG. 3B is stored in the data storage area 62B (S31: Multiple), the terminal program 65 extracts the designated device information including support operation ID "Print" (S32). In the example of FIG. 3B, the designated device information including the support operation ID "Print" and the device ID "the MFP-A" are extracted. The support operation ID which is included in the designated device information extracted in step S32, in the subsequent processing, is treated as a device operation ID of the MFP 10 identified by the corresponding device ID. The processing of step S32 is an example of an extraction processing. On the other hand, when it is determined that the designated device information including only one device ID, i.e. the designated device information illustrated in FIG. 3C is stored in the data storage area 62B (S31: 1), the terminal program 65 skips the processing of step S32.

Then, the terminal program 65 determines whether the overall operation flag is set to "ON" (S33). Further, the terminal program 65 determines whether all of the support operation ID of version 1.2 is included in the designated device information (S34). The processing of step S33 is an example of a third determination processing, and the processing of step S34 is an example of a fourth determination processing. When it is determined that the overall operation flag is set to "ON" (S33: ON), or all of the support operation ID are included in the designated device information (S34: Yes), The terminal program 65 skips the processing of step S35, i.e. ends the device information updating processing without executing a first reception processing (S42) described later.

On the other hand, when it is determined that the overall operation flag is not set to "ON" (S33: OFF) and at least one of the support operation ID is not included in the designated device information (S34: No), the terminal program 65 executes the device information reception processing (S35). The device information reception processing is a processing of receiving device information from the designated device. Referring to FIG. 5B, the details of the device information reception processing will be described.

[Device Information Reception Process]

The terminal program 65 transmits transmission request information, through the network interface 55, to the MFP 10A which is identified by a device ID "MFP-A" included in the designated device information (S41). The transmission request information that the terminal program 65 of version 1.2 transmits is information for requesting transmission of all device operation ID stored in the MIB. The transmission request information transmitted in step S51 described later is also the same. Then, the terminal program 65 receives the device information which is returned in response to the transmission request information from the MFP 10A through the network interface 55 (S42: Yes). The processing of step S42 is an example of a first reception processing.

Then, the terminal program 65 stores the device information which is received from the MFP 10A as new designated device information in the data storage area 62B (S43). That is, the terminal program 65 updates the designated device information already stored in the data storage area 62B to device information received in step S42. In addition, the terminal program 65 of version 1.2 sets the overall operation flag of the designated device information, which is updated, to "ON". The processing of step S43 is an example of the update processing.

In this embodiment, it is assumed that the designated device information illustrated in FIG. 3D are stored in the data storage area 62B after executing the update processing.

Then, the terminal program 65 set a reception completed flag to "ON" (S44) and end a device information reception processing. On the other hand, when the device information cannot be received even when a predetermined time elapses from the time of transmitting the transmission request information (S42: No), the terminal program 65 sets the reception completed flag to "OFF" (S45) and ends the device information reception processing.

Returning to FIG. 4, the terminal program 65 determines whether the designated device information is stored in the data storage area 62B (S16). Then, when it is determined that the designated device information is stored in the data storage area 62B (S16: Yes), the terminal program 65 specifies the operation icon corresponding to the device operation ID that is included in the designated device information among the operation icons that can be included in a main screen to be described later, (S17). The processing of step S17 is an example of a specification processing. On the other hand, when it is determined that the designated device information is not stored in the data storage area 62B (S16: No), the terminal program 65 determines to include all of the operation icons corresponding to the support operation on the main screen (S18).

Then, the terminal program 65 displays the main screen on the display 53 (S19). FIG. 9 is a diagram showing a display example of the main screen. Further, the terminal program 65 measures the elapse time from the time of displaying the main screen (S20). Furthermore, the terminal program 65 receives user operation onto the main screen through the user interface 54 (S23). The processing of step S19 is an example of a first display processing, and the processing of step S23 is an example of a reception processing. Further, the main screen is an example of the first screen.

Figure 9A:
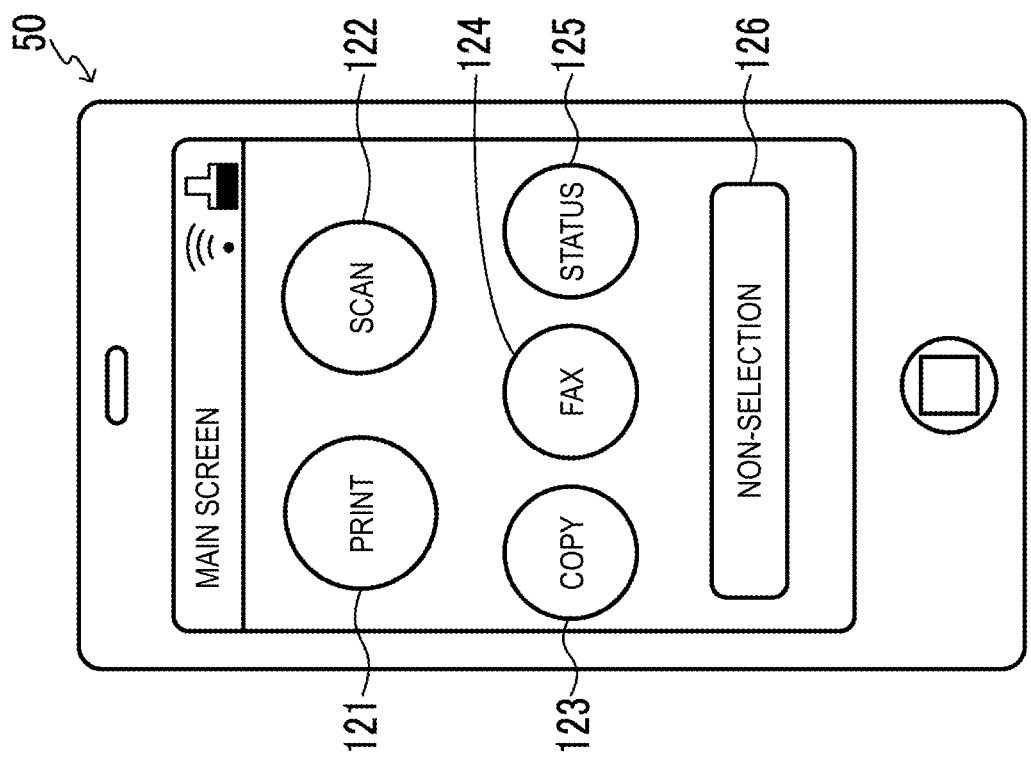
FIGS. 9A and 9B are a diagram showing a display example of the display 53.

FIG. 9A is a diagram showing an example of a main screen in a case where the designated device information illustrated in FIG. 3D is stored in the data storage area 62B. The main screen illustrated in FIG. 9A includes the operation icons 121, 124, a status icon 125, and a device icon 126. The operation icons 121 is an example of the operation object which is corresponding to the printing operation, the operation icon 124 is an example of the containing object corresponding to both the FAX transmission operation and the FAX preview transmission operation. The status icon 125 is corresponding to an instruction to display a status screen that shows the status of the designated device. A description of details of the status screen will be omitted. The device icon 126 is an example of a switching object which is corresponding to an instruction to switch the designated device. Further, In the device icon 126 illustrated in FIG. 9A, the designated device ID "MFP-A" at the present time is described.

Figure 9B:
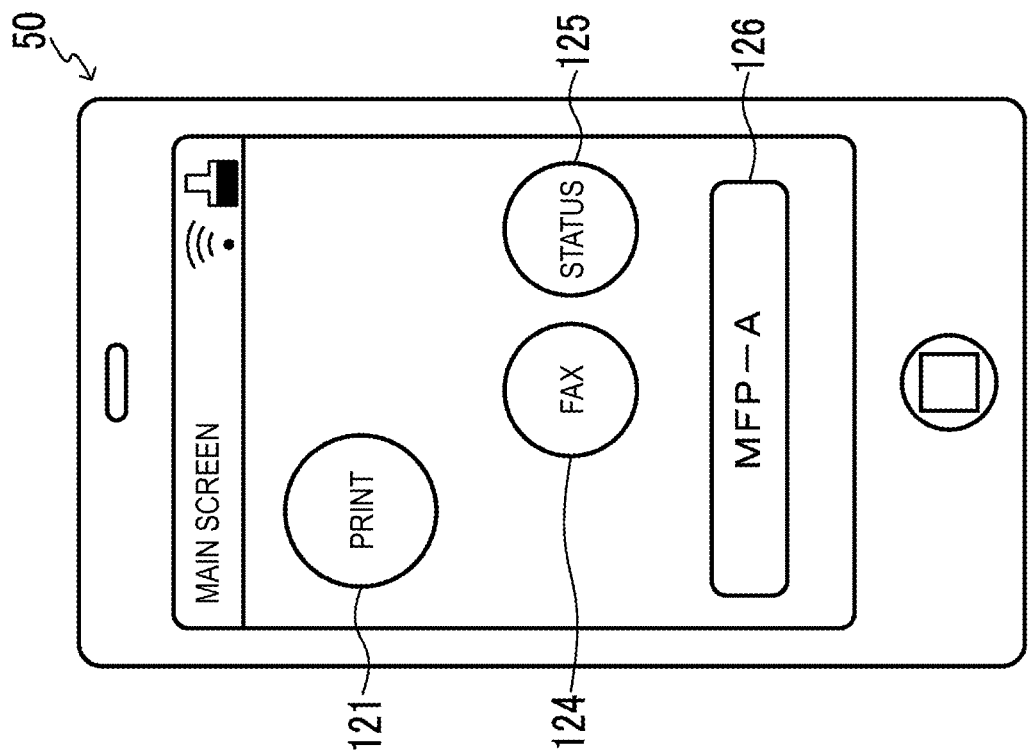

On the other hand, FIG. 9B is a diagram showing an example of a main screen in a case where the designated device information is not stored in the data storage area 62B. The main screen illustrated in FIG. 9B includes an operation icon 122, 123 in addition to the main screen illustrated in FIG. 9A. The operation icon 122 is an example of an operation object which is corresponding to the scan operation, and the operation icon 123 is an example of a combining operation object which is corresponding to a copy operation in which the printing operation and the scanning operation is combined. Further, in the device icon 126 illustrated in FIG. 9B, a string of "Not Selected" indicating that the designated device is not specified at the present time is described.

In a case (not illustrated in the drawings) that the device information in the first reception processing cannot be received (S42: No), the terminal program 65 of new version specifies an operation icon to be included in the main screen on the basis of the designated device information that the terminal program 65 of previous version is stored (S17). That is, the terminal program 65 can display the main screen including appropriate operation icons regardless of whether the terminal program 65 of previous version stores the designated device information, or regardless of whether the device information can be received by the first reception processing (S42).

Then, when the terminal program 65 cannot receive user operation through the user interface 54 until a predetermined time elapses from the time of displaying the main screen (S20: No), the terminal program 65 determines a value to which the reception completed flag is set (S21). Then, when it is determined that the reception completed flag is set to "OFF" (S21: OFF), the terminal program 65 executes the above-described device information reception processing (S22) and executes a processing of a step S16 and subsequent processings. On the other hand, when it is determined that the reception completed flag is set to "ON" (S21: ON), the terminal program 65 resets the elapse time under the measurement, and executes a processing of step S20 and subsequent processings.

That is, when the reception completed flag is set to "OFF" while the main screen is displayed on the display 53, the terminal program 65 repeatedly executes the first reception processing for every predetermined time interval (S42). Then, when receiving the device information from the designated device in the first reception processing, the terminal program 65 updates the designated device information to the received device information (S43) and updates the operation icon to be included in the main screen with using a new designated device information (S16 to S19).

Figure 6B:
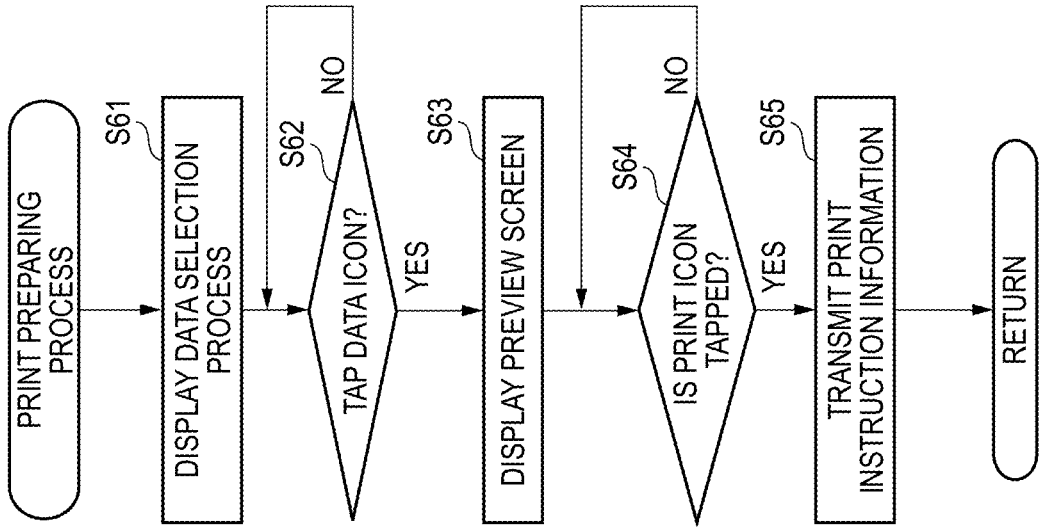
FIG. 6B is a flowchart of a print preparing processing.
Figure 6A:
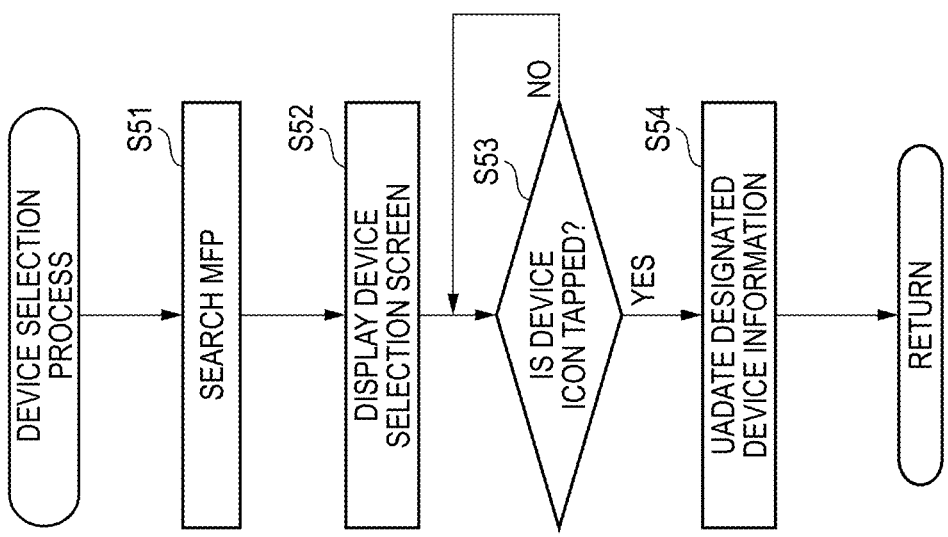
FIG. 6A is a flowchart of a device selection processing.
Figure 7:
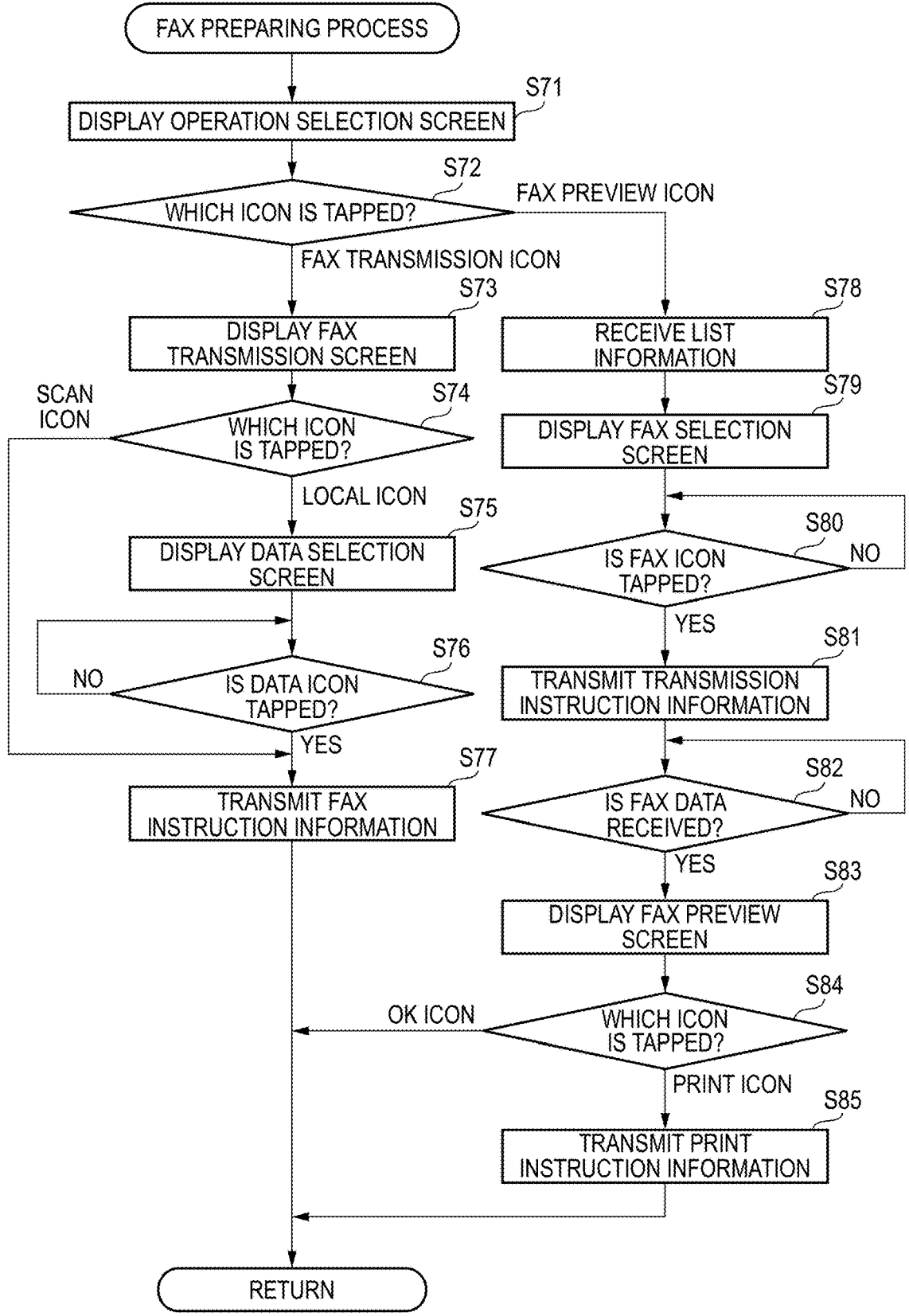
FIG. 7 is a flow chart of a FAX preparing processing.

Then, when receiving designation of the device icon 126 through the user interface 54 (S20: Yes & S23: device icon), the terminal program 65 executes the device selection processing (S24). The device selection processing is a processing of prompting a user to designate a designated device. With reference to FIG. 6A, the details of the device selection processing will be described.

[Device Selection Processing]

First, the terminal program 65 searches a plurality of the MFP 10 which can communicate through the network interface 55 (S51). Specifically, the terminal program 65 broadcasts, for example, the transmission request information to the communication network 101 through the network interface 55 by using SNMP (abbreviation for Simple Network Management Protocol). Then, the terminal program 65 receives the device information that the MFP 10 transmits from the MFP 10 through the network interface 55 as a response to the transmission request information. In the present embodiment, the MFPs 10A, 10B are specified. The processing of step S51 is an example of a second reception processing. The search of the plurality of the MFP 10 which can communicate may be executed by other methods which are well known.

Figure 10B:
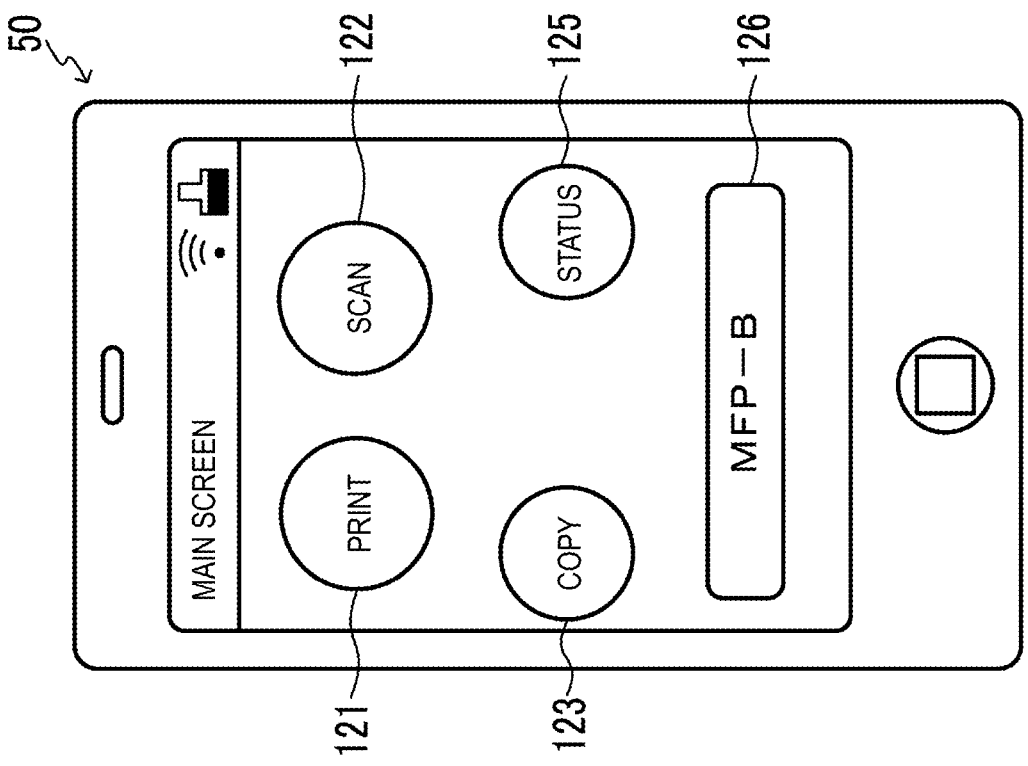
FIGS. 10A and 10B are a diagram showing a display example of the display 53.
Figure 10A:
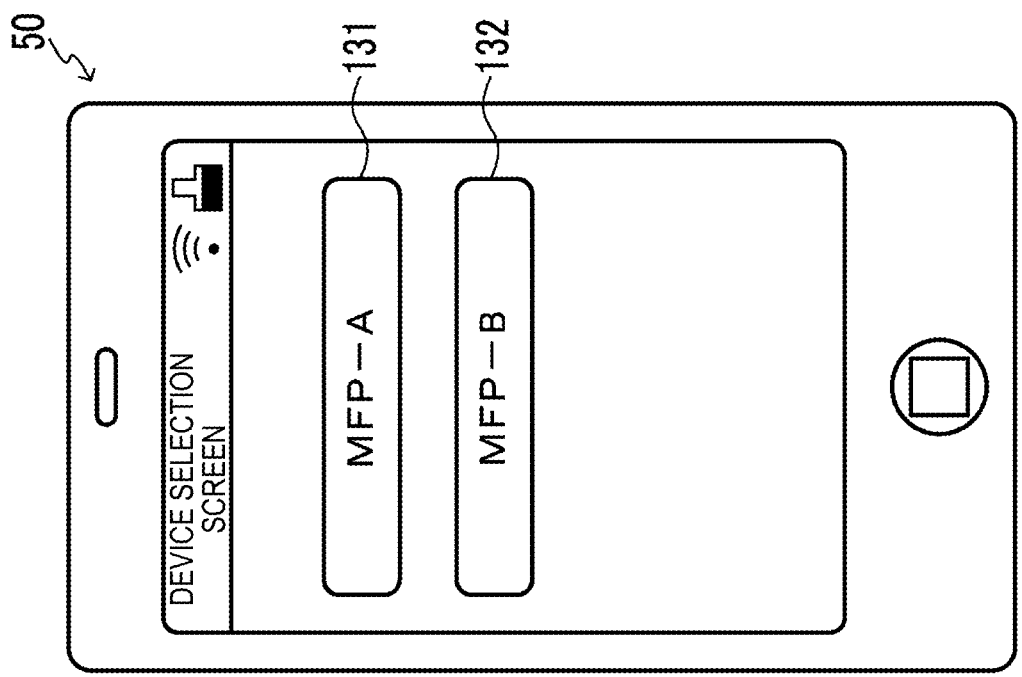

Then, the terminal program 65 displays the device selection screen on the display 53 (S52). FIG. 10A is a diagram showing an example of a device selection screen. A device selection screen illustrated in FIG. 10A includes device icons 131, 132. The device icons 131, 132 are corresponding to the MFPs 10A, 10B specified in step S51. Further, in the device icons 131, 132, the device IDs of the corresponding MFPs 10A, 10B are described. Then, the terminal program 65 accepts user operation to the device selection screen through the operation unit 54 (S53).

The processings of S51 to S53 are an example of a selection acceptance processing that a user selects one of a plurality of the MFPs 10A, 10B, which can communicate through the network interface 55, through the operation unit 54. In the user operation of selecting one of the MFPs 10A and 10B, "selecting" manipulation is not essential, except for the designation of a device icon which is corresponding to the user operation for designating one of the device icons displayed on the device selection screen.

Then, for example, when accepting the designation of a device icon 132 through the operation unit 54 (S53: Yes), the terminal program 65 updates the designated device information that is already stored in the data storage area 62B to the device information of the MFP 10B which is corresponding to the device icon 132 (S54). The user operation of designating the device icon 132 is an example of user operation for designating the MFP 10B as the designated device. The processing of step S54 is an example of a second update processing.

Referring back to FIG. 4 again, the terminal program 65 executes a processing of step S16 and subsequent processings by using the designated device information updated by the device selection processing. For example, when the device icon 132 is designated, the main screen illustrated in FIG. 10B is displayed on the display 53. The main screen illustrated in FIG. 10B includes the operation icons 121, 122,123, and a status icon 125, and a device icon 126 in which a device ID "MFP-B" of the MFP 10B is described.

When both the device operation ID "Print" and the device operation ID "Scan" are included in the designated device information, the terminal program 65 includes the operation icon 123 in the main screen as illustrated in FIG. 10B. On the other hand, when at least one of the device operation ID "Print" and the device operation ID "Scan" is not included in the designated device information, the terminal program does not include the operation icon 123 in the main screen 65 as illustrated in FIG. 9A. The printing operation is an example of a first operation, the scan operation is an example of a second operation, the device operation ID "Print" is an example of first operation information, and the device operation ID "Scan" is an example of second operation information.

When at least one of the device operation ID "FAX transmission" and the device operation ID "FAX preview transmission" is included in the designated device information, the terminal program 65 includes the operation icon 124 in the main screen as illustrated in FIG. 9A. On the other hand, when both of the device operation ID "FAX transmission" and the device operation ID "FAX preview transmission" are not included in the designated device information, the terminal program 65 does not include the operation icon 124 in the main screen as illustrated in FIG. 10B. The FAX transmission operation is an example of a third operation, the FAX preview transmission operation is an example of a fourth operation, the device operation ID "FAX transmission" is an example of third operation information, and the device operation ID "FAX preview transmission" is an example of fourth operation information.

Then, when accepting designation of one of the designated operation icons 121 to 124 included in the main screen through the operation unit 54 (S20: Yes & S23: Operation icon), the terminal program 65 stores temporarily the device operation ID which is corresponding to the designated operation icon in the data storage area 62B as the designated operation ID, and executes the execution preparing processing which is corresponding to the designated operation icon (S25). The user operation for designating the operation icon is an example of user operation of designating the designated operation.

The execution preparing processing is a processing for preparing the execution of the designated operation in the designated device. The execution preparing processing includes, for example, a processing of receiving the designation of the designated data, a processing of receiving designation of execution conditions of the designated operation, a processing for confirming an image of the execution result of the designated operation, and the like. The execution conditions of the designated operation includes, for example, the number of a recording sheet on which an image is recorded by the printing operation, reading resolution in the scan operation, a FAX number for specifying the external device of the FAX transmission destination of FAX transmission operation, and the like.

As an example, when accepting designation of an operation icon 121 through the operation unit 54, the terminal program 65 executes the print preparing processing which is an example of the execution preparing processing. As another example, when accepting the designation of an operation icon 124 through the operation unit 54, the terminal program 65 executes the FAX preparing processing which is an example of the execution preparing processing. Hereinafter, details of a print preparing processing and a FAX preparing processing in a case where the operation icons 121, 124 illustrated in FIG. 9A are designated will be described.

Although not illustrated, an execution preparing processing in a case where the operation icon 122 is designated may be, for example, a processing of receiving designation of the reading resolution of the scan operation, designation of a preservation place of an image data generated by the scanning operation, and the like. Further although not illustrated, an execution preparing processing in a case where the operation icon 123 is designated may be, for example, a processing of receiving designation of the reading resolution of the scanning operation, designation of layout (for example, 2 in 1) of the image recorded on the recording sheet by the printing operation, and the like.

[Print Preparing Process]

Figure 11A:
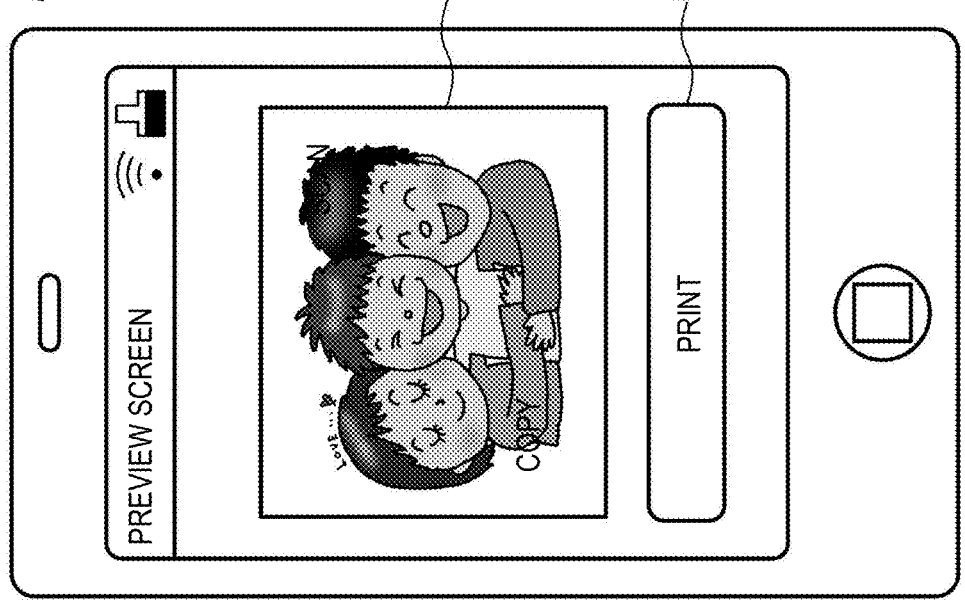
FIGS. 11A and 11B are a diagram showing a display example of the display 53.

First, the terminal program 65 displays the data selection screen on the display 53 (S61). FIG. 11A is a diagram showing an example of a data selection screen. The data selection screen illustrated in FIG. 11A includes a plurality of data icons 141, 142, and 143. The data icons 141 to 143 are corresponding to, for example, various types of data stored in the data folder, or various types of data stored in a server (not illustrated) on the Internet. Then, the terminal program 65 receives a user operation on the data selection screen through the user interface 54 (S62). The processing of step S62 is an example of a reception processing.

Then, for example, when receiving the designation of the data icon 141 through the user interface 54 (S62: Yes), the terminal program 65 determines the data "photograph.JPEG" which is corresponding to the data icon 141 as the designated data. A user operation for designating a data icon is an example of a user operation of designating the designated data.

Figure 11B:
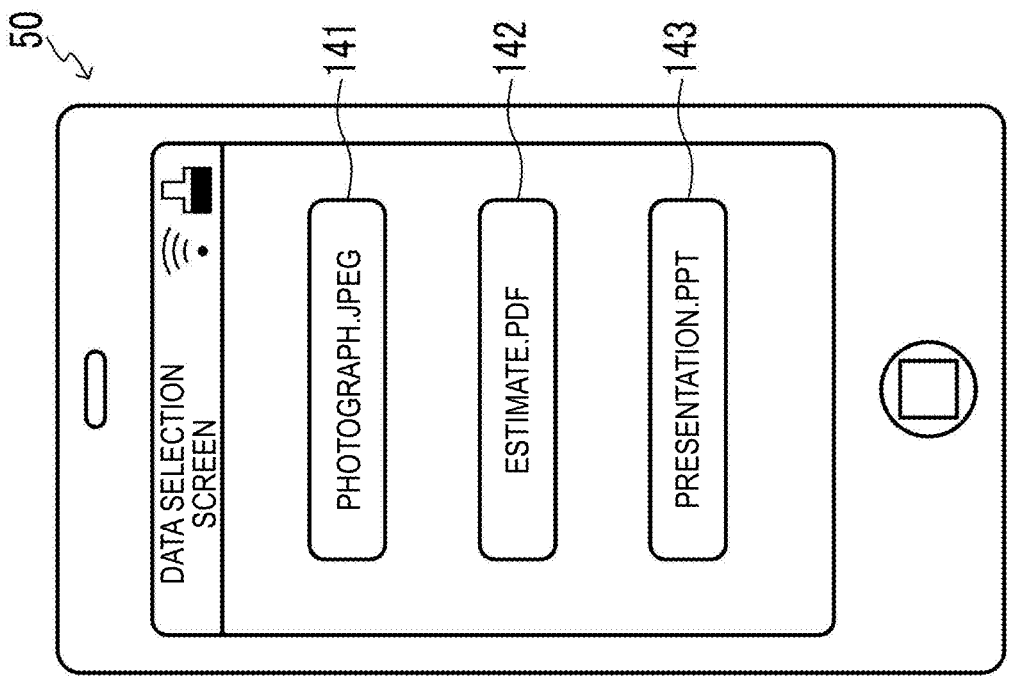

Then, the terminal program 65 displays a preview screen on the display 53 (S63). FIG. 11B is a diagram showing an example of a preview screen. The preview screen illustrated in FIG. 11B includes a preview image 145 and a "Print" icon 146. The preview image 145 is an image showing the result obtained by executing the designated operation which is corresponding to the designated data to the designated device. The preview image 145 according to the present embodiment shows an image obtained by recording an image represented by data "photograph.JPEG" on the recording sheet. The "Print" icon 146 is an example of an object of the execution instruction which is corresponding to the instruction to execute the designated operation. In other words, the "Print" icon 146 is corresponding to the instruction to execute the printing operation for the designated data to the designated device. In addition, the terminal program 65 receives the user operation for the preview screen through the user interface 54 (S64). The processing of step S64 is an example of a reception processing.

Then, when receiving the designation of the "Print" icon 146 through the user interface 54 (S64: Yes), the terminal program 65 transmits the print instruction information to the MFP 10A which is the designated device through the network interface 55 (S65). The print instruction information is information for executing the printing operation for the designated data. The print instruction information may include, for example, designated data, a designated data ID of identifying the designated data or, and a designated operation ID "print". A processing of step S55 is an example of an execution instruction processing. Meanwhile, although not illustrated, a device program 35 of the MFP 10A receives the print instruction information from the portable terminal 50 through the network interface 25. Then, the device program 35 causes the printer 11 to execute a printing operation according to the received print instruction information.

[FAX Preparing Processing]

Terminal program 65 displays the operation selection screen on the display 53 (S71). FIG. 12A is showing an example of the operation selection screen. The operation selection screen illustrated in FIG. 12A includes an act icon 148 and 149. The operation icon 148 is an example of the operation object corresponding to the FAX transmission operation, operation icons 149 is an example of the operation object corresponding to the FAX preview transmission operation. Then, the terminal program 65 receives a user operation on the operation selection screen through the user interface 54 (S72). The processing of step S72 is an example of a reception processing.

When a device operation ID "FAX transmission" is included in the designated device information, the terminal program 65 sets an operation icon 148 to a form where the designation is available. On the other hand, when the device operation ID "FAX transmission" is not included in the designated device information, the terminal program 65 sets the operation icon 148 to a form where the designation is not available (for example, gray-out, non-display). Similarly, when a device operation ID "FAX preview transmission" is included in the designated device information, the terminal program 65 sets the operation icon 149 to a stat that the designation is available. On the other hand, when a device operation ID "FAX preview transmission" is not included in the designated device information, the terminal program 65 sets the operation icon 149 to a form where the designation is not available (for example, gray-out, non-display).

Then, when receiving the designation of the operation icon 148 in a form where the designation is available through the user interface 54 (S72: FAX transmission icon), the terminal program 65 temporarily stores the device operation ID "FAX transmission" as designated operation ID in the storage area 62B. Then, the terminal program 65 displays the FAX transmission screen on the display 53 (S73). Then, the terminal program 65 receives a user operation for FAX transmission screen through the user interface 54 (S74). A processing of step S74 is an example of a reception processing.

FIG. 12B is a diagram showing an example of a FAX transmission screen. The FAX transmission screen illustrated in FIG. 12B includes an acquisition source icon 151, 152. The acquisition source icon 151 causes the scanner 12 to execute a scanning operation, and is an example of the execution instruction object which is corresponding to the instruction to transmit the image data generated by the scanning operation to the FAX 13 with using FAX transmission. The acquisition source icon 152 is an example of an execution instruction object which is corresponding to the instruction to transmit the image data stored in the data storage area 62B to the FAX 13 with using FAX transmission.

When the device operation ID "Scan" is included in the designated device information, the terminal program 65 sets the acquisition source icon 151 to a form where the designation is available. On the other hand, when the device operation ID "Scan" is not included in the designated device information, the terminal program 65 sets the acquisition source icon 151 to a form where the designation is not available (for example, gray-out, non-display). On the other hand, the terminal program 65 always sets the acquisition source icon 152 to a form where the designation is available. Furthermore, the FAX transmission screen may further include an acquisition source icon which is corresponding to the instruction to acquire the image data stored in a server on the Internet, or the like.

Then, when receiving the designation of the acquisition source icon 151 in a form where the designation is available through the user interface 54 (S74: Scan icon), the terminal program 65 transmits FAX instruction information to the MFP 10A is the designated device through the network interface 55 (S77). The FAX instruction information is information for executing the FAX transmission operation for the designated data. The processing of step S77 is an example of the execution instruction processing.

The FAX instruction information transmitted by the designation of the acquisition source icon 151 includes a designation operation ID "FAX transmission" and the scan instruction information for instructing the execution of the scanning operation. That is, the FAX instruction information is information of causing the scanner to execute a scanning operation to 12 and causing the FAX 13 to execute a FAX transmission operation of designating the image data generated by the scanning operation as the designation data. Also although not illustrated, the terminal program 65 receives, through the operating unit 54, a user operation of designating the transmission destination information (for example, FAX number) for identifying an external device of the FAX transmission destination and allows FAX instruction information to be in the transmission destination information.

Meanwhile, although not illustrated, the device program 35 of the MFP 10A receives the FAX instruction information from the portable terminal 50 through the network interface 25. Then, device program 35 causes the scanner 12 to execute the scanning operation according to the scan instruction information included in the FAX instruction information. The scanner 12 reads out an image recorded on a document which is set on a contact glass or ADF (not illustrated), and generates image data representing the image. The device program 35 causes the FAX 13 to execute a FAX transmission operation for the image data generated by the scanning operation of the scanner 12. That is, FAX 13 transmits the image data generated by the scanning operation, with using FAX transmission, to the external device identified by the transmission destination information included in the FAX instruction information.

When receiving the designation of the acquisition source icon 152 through the user interface 54 (S74: Local icon), the terminal program 65 displays, for example, the data selection screen illustrated in FIG. 11A on the display 53 (S75). Then, the terminal program 65 receives a user operation on the data selection screen through the user interface 54 (S76). The processings of steps S75, S76 may be the same as the processings of steps S61, S62.

Then, for example, when receiving the designation of a data icon 141 through the user interface 54 (S76: Yes), the terminal program 65 determines the data "photograph.JPEG" which is corresponding to the data icon 141 as the designated data. Then, the terminal program 65 transmits FAX instruction information to the MFP 10A which is the designated device through the network interface 55 (S77). The FAX instruction information to be transmitted by the designation of the acquisition source icon 152 includes designated data or a designated data ID, a designated operation ID "FAX transmission", and transmission destination information.

Meanwhile, although not illustrated, a device program 35 of the MFP 10A receives the FAX instruction information from the portable terminal 50 through the network interface 25. Then, device program 35 causes the FAX 13 to execute the FAX transmission operation according to the FAX instruction information. That is, FAX 13 transmits the designated data included in FAX instruction information or the designated data identified by the designated data ID included in the FAX instruction information, to the external device which is identified by the transmission destination information included in the FAX instruction information.

When receiving the designation of an operation icon 149 through the user interface 54 (S72: FAX preview icon), the terminal program 65 receives a plurality of FAX specification information included in the FAX list which is stored in the MFP 10A, from the MFP 10A which is the designated device through the network interface 55 (S78). More specifically, the terminal program 65 transmits the transmission request information of requesting the transmission of the FAX specification information to the MFP 10A through the network interface 55. Then, the terminal program 65 receives the FAX specification information which is transmitted in response to the transmission request information, from the MFP 10A through the network interface 55. Then, the terminal program 65 temporarily stores the received FAX specification information in the data storage area 62B.

Figure 13A:
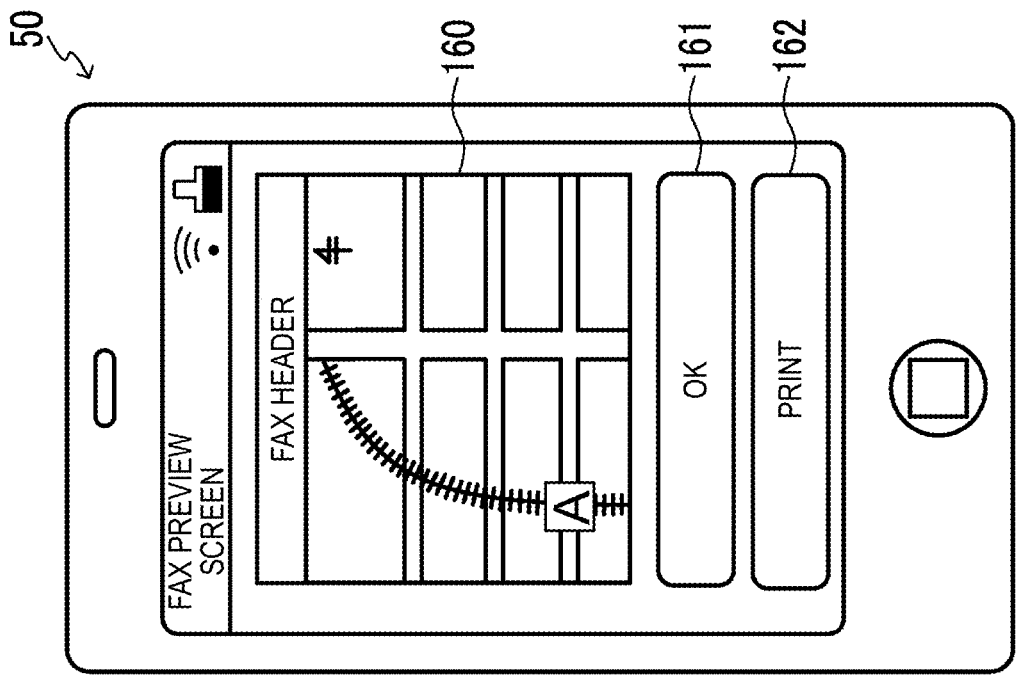
FIGS. 13A and 13B are a diagram showing a display example of the display 53.

Then, the terminal program 65 displays the FAX selection screen on the display 53 (S79). FIG. 13A is a diagram showing an example of the FAX selection screen. The FAX selection screen illustrated in FIG. 13A includes a plurality of FAX icons 155, 156. The FAX icons 155 and 156 are an example of the execution instruction object which is corresponding to the FAX preview transmission operation. The FAX icons 155 and 156 are respectively corresponding to a plurality of FAX specification information received in step S78. In addition, in the FAX icons 155 and 156, reception date and time, and the transmission source telephone number which are included in the corresponding FAX specification information are described. Then, the terminal program 65 receives a user operation for FAX selection screen through the user interface 54 (S80). The processing of step S80 is an example of a reception processing.

Then, for example, when receiving the designation of a FAX icon 155 through the user interface 54 (S80: Yes), the terminal program 65 transmits the transmission instruction information, through the network interface 55, to the MFP 10A which is the designated device (S81). The transmission instruction information is an example of the execution instruction information that instructs the transmission of the FAX data 1 specified by FAX specification information which is corresponding to the FAX icon 155. The transmission instruction information includes, for example, a designated operation ID "FAX preview Email" and a data ID "001" included in the FAX specification information which is corresponding to the FAX icon 155. Processing of step S81 is an example of the execution instruction processing.

Meanwhile, although not illustrated, a device program 35 of the MFP 10A receives the transmission instruction information from the portable terminal 50 through the network interface 25. Then, the device program 35 reads out FAX data 1 which is identified by the data ID "001" included in the transmission instruction information from the FAX list, and transmits the FAX data 1 to the portable terminal 50 through the network interface 25.

Figure 13B:
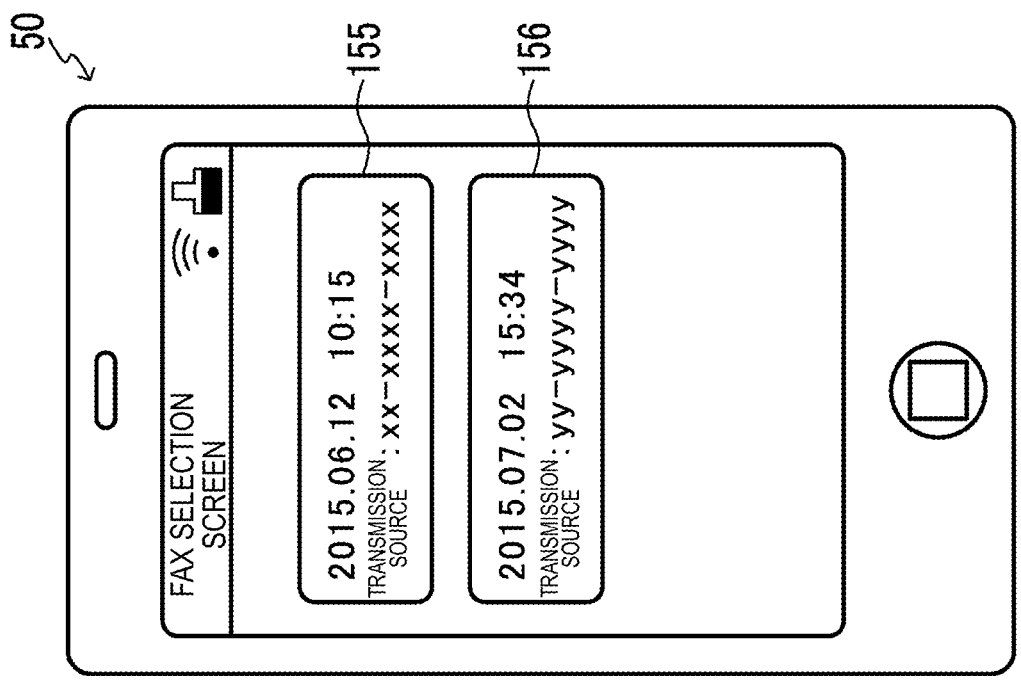

Next, the terminal program 65 receives the FAX data 1 from the MFP 10A through the network interface 55 (S82: Yes). Then, the terminal program 65 displays the FAX preview screen on the display 53 (S83). FIG. 13B is a diagram showing an example of the FAX preview screen. The FAX preview screen illustrated in FIG. 13B includes a FAX image 160 and operation icons 161, 162. Then, the terminal program 65 receives a user operation for the FAX preview screen through the user interface 54 (S84). The processing of step S84 is an example of a reception processing.

The FAX image 160 is an image which is represented by the FAX data 1 received in step S82. Further, in the FAX header included in FAX image 160, for example, reception date and time, and the transmission source telephone number which are included in the corresponding FAX specification information are included. The operation icon 161 is corresponding to the instruction of ending the display of the FAX preview screen. The operation icon 162 is an example of an execution instruction object which is corresponding to the execution instruction of the printing operation for FAX data 1. When the device operation ID "Print" is included in the designated device information, the terminal program 65 sets the operation icon 162 to a form where the designation is available. On the other hand, when a device operation ID "Print" is not included in the designated device information, the terminal program 65 sets the operation icon 162 to a form where the designation is not available (for example, gray-out, non-display).

Then, when receiving the designation of the operation icon 161 through the user interface 54 (S84: OK icon), the terminal program 65 ends the display of the FAX preview screen. On the other hand, when receiving the designation of the operation icon 162 of a form where the designation is available through the user interface 54 (S84: Print icon), the terminal program 65 transmits the print instruction information, through the network interface 55, to the MFP 10A which is the designated device (S85). The print instruction information may include, for example, the designated operation ID "Print" and the FAX data 1 which is the designated data or the designated data ID of identifying FAX data 1. The processing of step S85 and the processing of the MFP 10A that receives the print instruction information may be the same as step S65.

[Action and Effect of Embodiment]

According to the above embodiment, at a time when being initially started after version-upgrade installation is made, the terminal program 65 re-acquires the operation information from the designated device indicated by the device ID which is taken over from the terminal program 65 of previous version. In other words, the terminal program 65 of new version takes over the device ID but does not take over the device operation ID from the designated device information that the terminal program 65 of previous version registers. As a result, it is possible to provide a suitable user interface to the terminal program 65 of new version. However, the execution timing of the processings of the steps S12 to S15 is not limited to the time when the terminal program 65 initially starts, and the processings of the steps S12 to S15 may be only executed once at the timing that the terminal program 65 determines.

According to the above embodiment, when the terminal program 65 of previous version collects the device operation ID which is corresponding to all operations that the designated device can execute, the first reception processing is not executed. Further, according to the above embodiment, when all of the support operation IDs are net included in the designated device information, the first reception processing is not executed. As a result, it is possible to reduce unnecessary communication between the portable terminal 50 and the MFP 10. The traffic reduction in communication between the portable terminal 50 and the MFP 10 becomes particularly important, for example, when a support operation is further increased by version up.

According to the above embodiment, when the designated device information is not stored in the data storage area 62B, all the operation icons 121 to 124 are displayed on the main screen. That is, when the designated device information is not taken over from the terminal program of previous version, it is possible to present the guide lines to all support operations to a user.

According to the above embodiment, when a reception completed flag is set to "OFF" in the display of the main screen, the first reception processing is repeatedly executed at predetermined time intervals. As a result, the operation icon corresponding to the operation ID that the terminal program 65 of previous version collects is displayed on the main screen, prior to receiving the device operation ID in the first reception processing. Then, by receiving the device operation ID in the first reception processing, the operation icon to be included in the main screen based on the device operation ID is optimized.

The execution timing of the first reception processing in a case where the reception completed flag is set to "OFF" is not limited to the above example. For example, when the terminal program 65 receives the user operation for instructing the display of the main screen through the user interface 54 and the reception completed flag is set to "OFF", the terminal program 65 may execute a first reception processing prior to the display of the main screen and execute the first display processing with using the device information newly received by the first reception processing. The "user operation to instruct the display of the main screen" refers to a user operation of designating, for example, the transition icon which is corresponding to the display instruction of the main screen, or a back icon which is corresponding to the display instruction of the screen that is recently displayed According to the above embodiments, by the designation of the device icon 126, it is possible to allow a user to designate the designated device in the terminal program 65 of new version. Since the first display processing is executed with using the designated device information which is collected from the designated device, the operation icon to be included in the main screen is optimized.

In the above embodiments, since the terminal program 65 of version 1.2 acquires all of the device operation IDs stored in the MIB of the designated device, when version-upgrade is further made to the terminal program 65, it is possible to cause the terminal program 65 of new version to properly take over the designated device information.

A specific method in which the terminal program 65 of each version generates the designated device information is not limited to the above example. As an example, the terminal program 65 of version 1.0, 1.1 may request the MFP 10 to return all of the device operation ID, extract the device operation ID which matches the support operation ID from among the device operation IDs which are returned, and generate the designated device information including the extracted device operation ID. As another example, the terminal program 65 of version 1.2 may request the MFP 10 to return the device operation ID which is equal to the support operation ID, and also generate designated device information including the returned device operation ID. In this case, the designated device information does not include the overall operation flag "ON".

In the MFP 10 and the portable terminal 50 of the above embodiment, there has been described an example in which various programs stored in program storage areas 32A, 62A of the storages 32, 62 are executed by CPUs 31, 61, whereby each processing that the control unit of this disclosure executes is realized. However, the configuration of the control unit is not limited thereto, some or all of them may be realized by hardware such as an integrated circuit (also referred to as IC).

This disclosure may be realized not only as the MFP 10 and the portable terminal 50 but also as a program of causing the MFP 10 and the portable terminal 50 to execute processings. The program may be provided by being recorded in non-transitory recording medium. The non-transitory recording medium may include a CD-ROM, a DVD-ROM, and a storage included in a server which can be connected to the MFP 10 and the portable terminal 50 through the communication network 101. The program stored in the storage of the server may be distributed through a communication network 101 such as the Internet in the form of information or signal which is representing the program.

What is claimed is:

1. A non-transitory computer-readable medium storing current version instructions to control a portable terminal, which has a network interface, a display, a user interface, and a storage, the current version instructions causing the portable terminal to perform:
   determining whether the current version instructions are initially activated in the portable terminal after the current version instructions are installed based on initial acquisition information stored in the storage being set to a first value or a second value, the first value indicating that the current version instructions are initially activated after the current version instructions are installed and the second value indicating that the current version instructions were previously activated after the current version instructions are installed,
   wherein the initial acquisition information is set to the first value at a time when the current version instructions are installed and is initially activated in the portable terminal in which previous version instructions were installed, and the initial acquisition information is set to the second value after the current version instructions are installed and the first determination processing is initially executed; and
   determining whether designated device information that is set for each of a plurality of image processing devices having an execution unit capable of executing an operation for image data is stored in the storage by the previous version instructions, wherein the designated device information includes:
      device identification information identifying a designated device which is one of a plurality of image processing devices having an execution unit capable of executing the operation; and first operation identification information identifying an operation which is executable by the designated device;
         based on a determination that the current version instructions are initially activated after the current version instructions are installed and that the designated device information for the designated device is stored in the storage, receiving second operation identification information identifying an operation executable by the designated device, from the designated device that is identified by the device identification information included in the designated device information, through the network interface;
      updating, in response to receiving the second operation identification information, the first operation identification information stored in the storage to the second operation identification information;
      specifying a plurality of operation objects corresponding to the second operation identification information, which are stored in the storage, among a plurality of operation objects which are to be displayed on the display by the current version instructions;
      displaying a first screen including the plurality of operation objects on the display;
      receiving a user operation of designating one operation object of the plurality of displayed operation objects including the operation object through the user interface; and
      preparing the designated device to execute an operation corresponding to the designated operation object;
   wherein the current version instructions further cause the portable terminal to perform:
      determining whether an overall operation acquisition information stored in the storage is set to a third value, wherein the third value is a value to which the overall operation acquisition information is set by the previous version instructions at a time when the designated device information including the first operation identification information corresponding to all operations that are executable by the designated device is stored in the storage,
      wherein receiving the second operation identification information occurs when it is determined that the initial acquisition information is set to the first value, that the designated device information is stored, and that the overall operation acquisition information is not set to the third value; and
      wherein, when it is determined that the overall operation acquisition information is set to the third value, the portable terminal is prevented from receiving the second operation identification information.

2. The non-transitory computer-readable medium according to claim 1, wherein the second operation identification information identifies all operations that are executable by the designated device, from the designated device through the network interface, and wherein the current version instructions further cause the portable terminal to set the overall operation acquisition information to the third value when the first operation identification information is updated to the second operation identification information.

3. The non-transitory computer-readable medium according to claim 1, wherein the current version instructions further cause the portable terminal to perform:

determining whether all of the operation identification information used to prepare the designated device to execute the operation corresponding to the designated operation object is included in the designated device information;

receiving the second operation identification information based on a determination that the initial acquisition information is set to the first value, the designated device information is stored, the overall operation acquisition information is not set to the third value, and at least one of the first operation identification information is not included in the designated device information; and preventing the portable terminal from receiving the second operation identification information when it is determined that all of the first operation identification information is included in the designated device information.

4. The non-transitory computer-readable medium according to claim 3, wherein when it is determined that the designated device information is not stored in the storage, the current version instructions cause the first screen to be displayed including the operation object corresponding to each of the at least one of the first operation identification information and the second operation identification information on the display, without receiving the second operation identification information or updating the first operation identification information stored in the storage to the second operation identification information.

5. The non-transitory computer-readable medium according to claim 1, wherein the current version instructions further cause the portable terminal to perform:

setting, when the second operation identification information is not received from the designated device, reception completed information stored in the storage to a fifth value;

while the reception completed information is set to the fifth value while the first screen is displayed on the display, for each predetermined time interval, determining whether second operation identification information is received; and when the second operation identification information is received releasing the fifth value of the reception completed information.

6. The non-transitory computer-readable medium according to claim 5, wherein the current version instructions further cause the portable terminal to:

when a user operation for instructing display of the first screen is received and the reception completed information is set to the fifth value, determine whether second operation identification information is received prior to displaying the first screen.

7. The non-transitory computer-readable medium according to claim 1, wherein the first screen includes a switching object which is corresponding to switching of the designated device, wherein when a user operation for designating the switching object is received, the current version instructions cause the portable terminal to perform a processing comprising:

prompting a user to select, by the user interface, one of the plurality of the image processing devices in which communication is available through a network interface;

in response to selecting one of the plurality of the image processing devices, receiving third operation identification information identifying the operation executable by the selected designated device through the network interface from the selected image processing device from among the plurality of the image processing devices; and in response to receiving the third operation identification information, updating the designated device information stored in the storage to the device identification information identifying the selected image processing device and to the designated device information including the operation identification information;

wherein when specifying the plurality of operation objects, a plurality of operation objects corresponding to at least one of the first operation identification information, the second operation identification information, and the third operation identification information is specified, and wherein the plurality of operation objects specified based on the first operation identification information, the second operation identification information, and the third operation identification information are displayed on the first screen on the display.

8. The non-transitory computer-readable medium according to claim 1, wherein the current version instructions further cause the portable terminal to perform:

when a plurality of the designated device information is stored in the storage by the previous version instructions, extracting the designated device information including the first operation identification information for identifying a printing operation, wherein the printing operation is an operation of recording an image represented by an image data on a sheet, wherein receiving the second operation identification information, updating the first operation identification information stored in the storage to the second operation identification information, and displaying the first screen are performed using the extracted designated device information.

9. The non-transitory computer-readable medium according to claim 1, wherein the current version instructions further cause the portable terminal to perform:

when the current version instructions are activated by an OS of the portable terminal, determining whether the current version instructions are initially activated in the portable terminal after the current version instructions are installed.

10. The non-transitory computer-readable medium according to claim 1, wherein the current version instructions further cause the portable terminal to perform:

displaying a second screen on the display, in parallel with receiving the second operation identification information and updating the first operation identification information stored in the storage to the second operation identification information, when it is determined that the initial acquisition information is set to the first value, wherein the second screen includes a message indicating a use condition of the current version instructions and a consent object corresponding to consent to the use condition; and when the user operation for designating the consent object is received in the receiving processing, displaying the first screen on the display.

11. The non-transitory computer-readable medium according to claim 1, wherein the current version instructions further cause the portable terminal to perform:

displaying the execution instruction object corresponding to the execution instruction of the designated operation on the display; and transmitting execution instruction information to the designated device through the network interface, when a user operation for designating the execution instruction object is received while preparing the designated device to execute an operation corresponding to the designated operation object, wherein the execution instruction information is information for instructing the execution of the designated operation.

12. A non-transitory computer-readable medium storing current version instructions to control a portable terminal, which has a network interface, a display, a user interface, and a storage, the current version instructions causing the portable terminal to perform:

determining whether the current version instructions are initially activated in the portable terminal after the current version instructions are installed based on initial acquisition information stored in the storage, being set to a first value or a second value, the first value indicating that the current version instructions are initially activated after the current version instructions are installed and the second value indicating that the current version instructions were previously activated after the current version instructions are installed, wherein the initial acquisition information is set to the first value at a time when the current version instructions are installed and is initially activated in the portable terminal in which previous version instructions were installed, and the initial acquisition information is set to the second value after the current version instructions are installed and the first determination processing is initially executed; and determining whether designated device information that is set for each of a plurality of image processing devices having an execution unit capable of executing an operation for image data is stored in the storage by the previous version instructions, wherein the designated device information includes:

device identification information identifying a designated device which is one of a plurality of image processing devices having an execution unit capable of executing the operation, and first operation identification information identifying an operation which is executable by the designated device, based on a determination that the current version instructions are initially activated after the current version instructions are installed and that the designated device information for the designated device is stored in the storage, receiving second operation identification information identifying an operation executable by the designated device, from the designated device that is identified by the device identification information included in the designated device information, through the network interface;

updating, in response to receiving the second operation identification information, the first operation identification information stored in the storage to the second operation identification information;

specifying a plurality of operation objects corresponding to the second operation identification information, which are stored in the storage, a plurality of operation objects which are to be displayed on the display by the current version instructions;

displaying a first screen including the plurality of operation objects on the display;

receiving a user operation of designating one operation object of the plurality of displayed operation objects including the operation object through the user interface; and preparing the designated device to execute an operation corresponding to the designated operation object, wherein the first screen is capable of including a combined operation object which is the operation object supporting to a combined operation in which a first operation and a second operation are combined, and wherein the current version instructions further cause the portable terminal to perform:

displaying, in a case where both a first operation information and a second operation information are included in the designated device information, the first screen including the combined operation object on the display, wherein the first operation information is one operation identification information of identifying the first operation and the second operation information is the other operation identification information of identifying the second operation; and displaying, in a case where at least one of the first operation information and the second operation information is not included in the designated device information, the first screen not including the combined operation object on the display.

13. The non-transitory computer-readable medium according to claim 12, wherein the first screen includes an inclusion object which is the operation object supporting both a third operation and a fourth operation, wherein the third operation and the fourth operation are executable by the same execution unit, wherein the current version instructions further cause the portable terminal to perform:

displaying, in a case where at least one of a third operation information and a fourth operation information is included in the designated device information, the first screen including the inclusion object on the display, wherein the third operation information is identification information of identifying the third operation and the fourth operation information is identification information of identifying the fourth operation; and displaying, in a case where both the third operation information and the fourth operation information are not included in the designated device information, the first screen not including the inclusion object on the display in the first display processing.

14. A method of controlling a portable terminal, which stores current version instructions and has a network interface, a display, a user interface, and a storage, the method comprising:

determining whether the current version instructions are initially activated in the portable terminal after the current version instructions are installed based on initial acquisition information stored in the storage, being set to a first value or a second value, the first value indicating that the current version instructions are initially activated after the current version instructions are installed and the second value indicating that the current version instructions were previously activated after the current version instructions are installed, wherein the initial acquisition information is set to the first value at a time when the current version instructions are installed and is initially activated in the portable terminal in which previous version instructions were installed, and the initial acquisition information is set to the second value after the current version instructions are installed and the first determination processing is initially executed; and determining whether designated device information that is set for each of a plurality of image processing devices having an execution unit capable of executing an operation for image data is stored in the storage by the previous version instructions, wherein the designated device information includes:

device identification information identifying a designated device which is one of a plurality of image processing devices having an execution unit capable of executing the operation, and first operation identification information identifying an operation which is executable by the designated device, based on a determination that the current version instructions are initially activated after the current version instructions are installed and that the designated device information for the designated device is stored in the storage, receiving second operation identification information identifying an operation executable by the designated device, from the designated device that is identified by the device identification information included in the designated device information, through the network interface;

updating, in response to receiving the second operation identification information, the first operation identification information stored in the storage to the second operation identification information;

specifying a plurality of operation objects corresponding the second operation identification information, which are stored in the storage, a plurality of operation objects which are to be displayed on the display by the current version instructions;

displaying a first screen including the plurality of specified operation objects on the display;

receiving a user operation of designating one operation object of the plurality of displayed operation objects including the specified operation object through the user interface; and preparing the designated device to execute an operation corresponding to the designated operation object, wherein the first screen is capable of including a combined operation object which is the operation object supporting to a combined operation in which a first operation and a second operation are combined, and wherein the current version instructions further cause the portable terminal to perform:

displaying, in a case where both a first operation information and a second operation information are included in the designated device information, the first screen including the combined operation object on the display, wherein the first operation information is one operation identification information of identifying the first operation and the second operation information is the other operation identification information of identifying the second operation; and displaying, in a case where at least one of the first operation information and the second operation information is not included in the designated device information, the first screen not including the combined operation object on the display.

* * * * *